US012424133B2

(12) United States Patent
Seo et al.

(10) Patent No.: US 12,424,133 B2
(45) Date of Patent: Sep. 23, 2025

(54) DISPLAY DEVICE

(71) Applicant: Samsung Display Co., LTD., Yongin-si (KR)

(72) Inventors: Young Wan Seo, Yongin-si (KR); Jun Hyun Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/781,244

(22) Filed: Jul. 23, 2024

(65) Prior Publication Data

US 2025/0209946 A1 Jun. 26, 2025

(51) Int. Cl.
*G09G 3/00* (2006.01)
*G09G 3/3266* (2016.01)
*G09G 3/3291* (2016.01)

(52) U.S. Cl.
CPC ........... *G09G 3/006* (2013.01); *G09G 3/3266* (2013.01); *G09G 3/3291* (2013.01); *G09G 2330/12* (2013.01)

(58) Field of Classification Search
CPC ..... G09G 3/006; G09G 3/3266; G09G 3/3291
See application file for complete search history.

(56) References Cited

U.S. PATENT DOCUMENTS 9,111,491 B2 8/2015 Woo et al.
9,773,439 B2 9/2017 Chaji
9,984,607 B2 5/2018 Chaji
10,417,945 B2 9/2019 Chaji
10,650,715 B2 5/2020 Cho
11,049,426 B2 6/2021 Chaji
11,054,708 B2 7/2021 Iwasa
11,996,042 B2 5/2024 Katsui et al.
2015/0077681 A1* 3/2015 Li ......................... G02F 1/1309 349/47
2021/0199727 A1 7/2021 Xu et al.
2021/0256888 A1* 8/2021 Zhu ........................ G09G 3/006

FOREIGN PATENT DOCUMENTS

| | | |
|---|---|---|
| CN | 114582259 | 6/2022 |
| JP | 2014-517940 | 7/2014 |
| JP | 2021-039297 | 3/2021 |
| KR | 10-2014-0081450 | 7/2014 |
| KR | 10-1844529 | 4/2018 |
| KR | 10-2019-0084195 | 7/2019 |
| KR | 10-2022-0002323 | 1/2022 |
| KR | 10-2023-0060563 | 5/2023 |
| KR | 10-2024-0013978 | 1/2024 |

* cited by examiner

*Primary Examiner* — Sardis F Azongha
(74) *Attorney, Agent, or Firm* — Innovation Counsel LLP

(57) ABSTRACT

A display device comprises a plurality of pixels arranged in a display area of a display panel, a test switching element area formed in a non-display area or a sub-area of the display panel and including a plurality of test switching elements, and a display driving circuit controlling supply timings of data voltages and driving control signals supplied to the plurality of pixels, wherein the display driving circuit controls turn-off switching operations of the plurality of test switching elements so that the plurality of test switching elements are maintained in a turn-off state during an image display period.

20 Claims, 16 Drawing Sheets

DISPLAY DEVICE

CROSS-REFERENCE TO RELATED APPLICATION

This application claims priority to and benefits of Korean Patent Application No. 10-2023-0188340 under 35 U.S.C. § 119, filed on Dec. 21, 2023 in the Korean Intellectual Property Office (KIPO), the entire contents of which are incorporated herein by reference.

BACKGROUND

1. Technical Field

The disclosure relates to a display device.

2. Description of the Related Art

As the information society develops, the demand for display devices for displaying images has increased and diversified. For example, display devices have been applied to various electronic devices such as smartphones, digital cameras, laptop computers, navigation devices, and smart televisions.

The display devices may be flat panel display devices such as liquid crystal display devices, field emission display devices, or organic light emitting display devices. Among such flat panel display devices, a light emitting display device may display an image without a backlight unit providing light to a display panel because each of pixels of the display panel includes light emitting elements that may emit light by themselves.

The display panel is manufactured by forming pixels, driving circuits, and the like, according to resolution in cell regions of a mother glass, separating the respective cell regions, and modularizing the separated cell regions into display panels. Before each display panel is commercialized, test data voltages and scan signals are supplied to all pixels using test switching elements formed on the display panel, and light emitting states, defects, and the like, of the pixels are tested.

SUMMARY

Aspects of the disclosure provide a display device that allows test switching elements formed on a display panel to be stably maintained in a turn-off state even after the display panel is commercialized.

Aspects of the disclosure also provide a display device capable of controlling test switching elements of a display panel to be stably maintained in a turn-off state.

However, aspects of the disclosure are not restricted to those set forth herein. The above and other aspects of the disclosure will become more apparent to one of ordinary skill in the art to which the disclosure pertains by referencing the detailed description of the disclosure given below.

According to an embodiment of the disclosure, a display device comprises a plurality of pixels arranged in a display area of a display panel, a test switching element area formed in a non-display area or a sub-area of the display panel and including a plurality of test switching elements, and a display driving circuit controlling supply timings of data voltages and driving control signals supplied to the plurality of pixels. The display driving circuit controls turn-off switching operations of the plurality of test switching elements so that the plurality of test switching elements are maintained in a turn-off state during an image display period.

In an embodiment, the plurality of test switching elements may be electrically connected to a plurality of data lines formed in the display area or a plurality of fan-out lines formed in the non-display area in a one-to-one manner in parallel structures with the plurality of data lines or the plurality of fan-out lines.

In an embodiment, the plurality of test switching elements may be electrically connected to a plurality of gate lines formed in the display area or a plurality of power lines extending to the non-display area in a one-to-one manner in parallel structures with the plurality of gate lines or the plurality of power lines.

In an embodiment, respective first electrodes formed in the plurality of test switching elements may be electrically connected to the plurality of data lines in a one-to-one manner, respective second electrodes formed in the plurality of test switching elements may be electrically connected to at least one first line terminal to which a test direct current (DC) voltage or a first off control signal is supplied, and respective gate electrodes formed in the plurality of test switching elements may be electrically connected to at least one second line terminal to which a gate-on signal or a second off control signal is supplied.

In an embodiment, the plurality of test switching elements may receive the first off control signal supplied to the respective first electrodes during an image display period, and the plurality of test switching elements may be maintained in a turn-off state in response to a second off control signal input to the respective gate electrodes.

In an embodiment, the display driving circuit may maintain the respective second electrodes of the plurality of test switching elements in a floating state through the at least one first line terminal or supplies the first off control signal to the at least one first line terminal, and the display driving circuit may turn off the plurality of test switching elements by supplying a second off control signal to the respective gate electrodes of the plurality of test switching elements through the at least one second line terminal.

In an embodiment, the display driving circuit may turn off the plurality of test switching elements by supplying the second off control signal having a lower voltage magnitude than the first off control signal to the respective gate electrodes of the plurality of test switching elements.

In an embodiment, respective first electrodes formed in the plurality of test switching elements may be electrically connected to the plurality of data lines in a one-to-one manner, respective second electrodes formed in the plurality of test switching elements may be electrically connected to at least one first line terminal to which a test DC voltage or a first off control signal is supplied, first gate electrodes of respective gate electrodes formed as double layers in the plurality of test switching elements may be electrically connected to at least one second line terminal to which a gate-on signal or a second off control signal is supplied, and second gate electrodes of the respective gate electrodes formed as the double layers in the plurality of test switching elements may be electrically connected to a DC voltage line terminal to which a third off control signal having a preset DC voltage magnitude is supplied.

In an embodiment, the display driving circuit may maintain the respective second electrodes of the plurality of test switching elements in a floating state through the at least one first line terminal or supplies the first off control signal to the at least one first line terminal, the display driving circuit may turn off the plurality of test switching elements by supplying the second off control signal to the first respective gate electrodes of the plurality of test switching elements through the at least one second line terminal, and the display driving circuit may supply the third off control signal having the preset DC voltage magnitude to the respective second gate electrodes through the DC voltage line terminal.

In an embodiment, the display driving circuit may turn off the plurality of test switching elements by supplying the second off control signal having a lower voltage magnitude than the first off control signal to the respective first gate electrodes of the plurality of test switching elements.

In an embodiment, respective first electrodes formed in the plurality of test switching elements may be electrically connected to the plurality of data lines in a one-to-one manner, respective second electrodes formed in the plurality of test switching elements may be electrically connected to at least one first line terminal to which a test DC voltage or a first off control signal is supplied, first gate electrodes of respective gate electrodes formed as double layers in the plurality of test switching elements may be electrically connected to at least one second line terminal to which a gate-on signal or a second off control signal is supplied, and second gate electrodes of the respective gate electrodes formed as the double layers in the plurality of test switching elements may be electrically connected to an alternating current (AC) voltage line terminal to which a third off control signal swinging within a preset voltage range and having an AC voltage magnitude is supplied.

In an embodiment, the display driving circuit may maintain the respective second electrodes formed in the plurality of test switching elements in a floating state through the at least one first line terminal or supplies the first off control signal to the at least one first line terminal, the display driving circuit may turn off the plurality of test switching elements by supplying the second off control signal to the first respective gate electrodes formed in the plurality of test switching elements through the at least one second line terminal, and the display driving circuit may supply the third off control signal swinging within the preset voltage range and having the AC voltage magnitude to the respective second gate electrodes through the AC voltage line terminal.

According to an embodiment of the disclosure, a display device comprises a plurality of pixels arranged in a display area of a display panel, a gate driver supplying scan signals to gate lines arranged in a non-display area and the display area of the display panel, a test switching element area formed in the non-display area or a sub-area of the display panel and including a plurality of test switching elements, and a display driving circuit controlling supply timings of data voltages and driving control signals supplied to the plurality of pixels and gate control signals supplied to the gate driver, wherein the display driving circuit controls turn-off switching operations of the plurality of test switching elements so that the plurality of test switching elements are maintained in a turn-off state during an image display period.

In an embodiment, the plurality of test switching elements may be electrically connected to a plurality of data lines formed in the display area or a plurality of fan-out lines formed in the non-display area in a one-to-one manner in parallel structures with the plurality of data lines or the plurality of fan-out lines.

In an embodiment, the plurality of test switching elements may be electrically connected to a plurality of gate lines formed in the display area or a plurality of power lines extending to the non-display area in a one-to-one manner in parallel structures with the plurality of gate lines or the plurality of power lines.

In an embodiment, respective first electrodes formed in the plurality of test switching elements may be electrically connected to the plurality of gate lines in a one-to-one manner, respective second electrodes formed in the plurality of test switching elements may be electrically connected to at least one first line terminal to which a test scan voltage or a first off control signal is supplied, and respective gate electrodes formed in the plurality of test switching elements may be electrically connected to at least one second line terminal to which a gate-on signal or a second off control signal is supplied.

In an embodiment, the display driving circuit may maintain the respective second electrodes formed in the plurality of test switching elements in a floating state through the at least one first line terminal or supplies the first off control signal to the at least one first line terminal, and the display driving circuit may turn off the plurality of test switching elements by supplying the second off control signal to the respective gate electrodes formed in the plurality of test switching elements through the at least one second line terminal.

In an embodiment, respective first electrodes formed in the plurality of test switching elements may be electrically connected to the plurality of data lines in a one-to-one manner, respective second electrodes formed in the plurality of test switching elements may be electrically connected to at least one first line terminal to which a test DC voltage or a first off control signal is supplied, and respective gate electrodes formed in the plurality of test switching elements may be electrically connected to at least one second line terminal to which a gate-on signal or a second off control signal is supplied.

In an embodiment, respective first electrodes formed in the plurality of test switching elements may be electrically connected to the plurality of data lines in a one-to-one manner, respective second electrodes formed in the plurality of test switching elements may be electrically connected to at least one first line terminal to which a test DC voltage or a first off control signal is supplied, first gate electrodes of respective gate electrodes formed as double layers in the plurality of test switching elements may be electrically connected to at least one second line terminal to which a gate-on signal or a second off control signal is supplied, and second gate electrodes of the respective gate electrodes formed as the double layers in the plurality of test switching elements may be electrically connected to a DC voltage line terminal to which a third off control signal having a preset DC voltage magnitude is supplied.

In an embodiment, respective first electrodes formed in the plurality of test switching elements may be electrically connected to the plurality of data lines in a one-to-one manner, respective second electrodes formed in the plurality of test switching elements may be electrically connected to at least one first line terminal to which a test DC voltage or a first off control signal is supplied, first gate electrodes of respective gate electrodes formed as double layers in the plurality of test switching elements may be electrically connected to at least one second line terminal to which a gate-on signal or a second off control signal is supplied, and second gate electrodes of the respective gate electrodes formed as the double layers in the plurality of test switching elements may be electrically connected to an AC voltage line terminal to which a third off control signal swinging within a preset voltage range and having an AC voltage magnitude is supplied.

A display device according to an embodiment of the disclosure may prevent current and voltage leakage of lines and pixels of a display panel by changing a design so that test switching elements formed on the display panel are stably maintained in a turn-off state even after the display panel is commercialized.

The display device according to an embodiment of the disclosure may prevent an image display defect due to voltage and current leakage and increase reliability of a product by controlling the test switching elements of the display panel to be stably maintained in the turn-off state.

The effects of the disclosure are not limited to the aforementioned effects, and various other effects are included in the specification.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
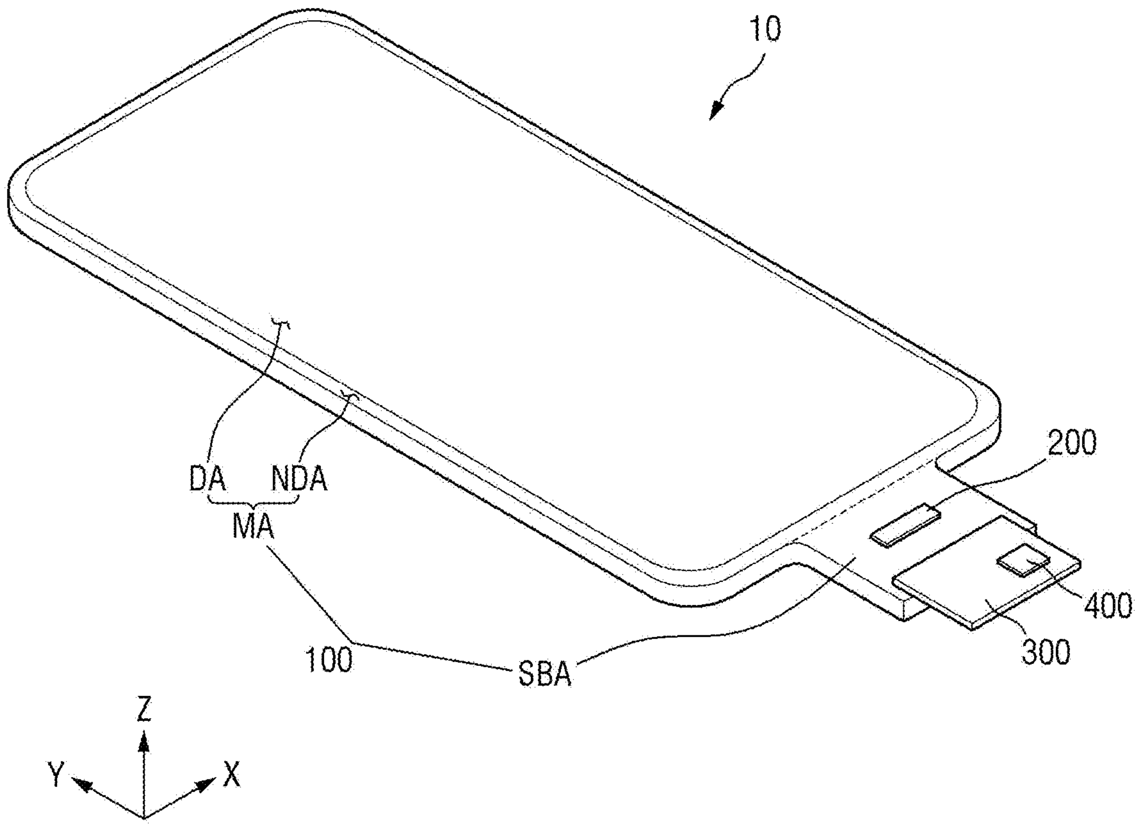
FIG. 1 is a schematic perspective view illustrating a display device according to a first embodiment.

The disclosure will now be described more fully hereinafter with reference to the accompanying drawings, in which preferred embodiments of the disclosure are shown. This disclosure may, however, be embodied in different forms and should not be construed as limited to the embodiments set forth herein. Rather, these embodiments are provided so that this disclosure will be thorough and complete, and will convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

When an element is referred to as being "on," "connected to," or "coupled to" another element, it may be directly on, connected to, or coupled to the other element or intervening elements or layers may be present. When, however, an element is referred to as being "directly on," "directly connected to," or "directly coupled to" another element, there are no intervening elements or layers present. To this end, the term "connected" may refer to physical, electrical, and/or fluid connection, with or without intervening elements.

The term "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

Each of the features of the various embodiments of the disclosure may be combined or combined with each other, in part or in whole, and technically various interlocking and driving are possible. Each embodiment may be implemented independently of each other or may be implemented together in an association.

Hereinafter, specific embodiments will be described with reference to the accompanying drawings.

Figure 2:
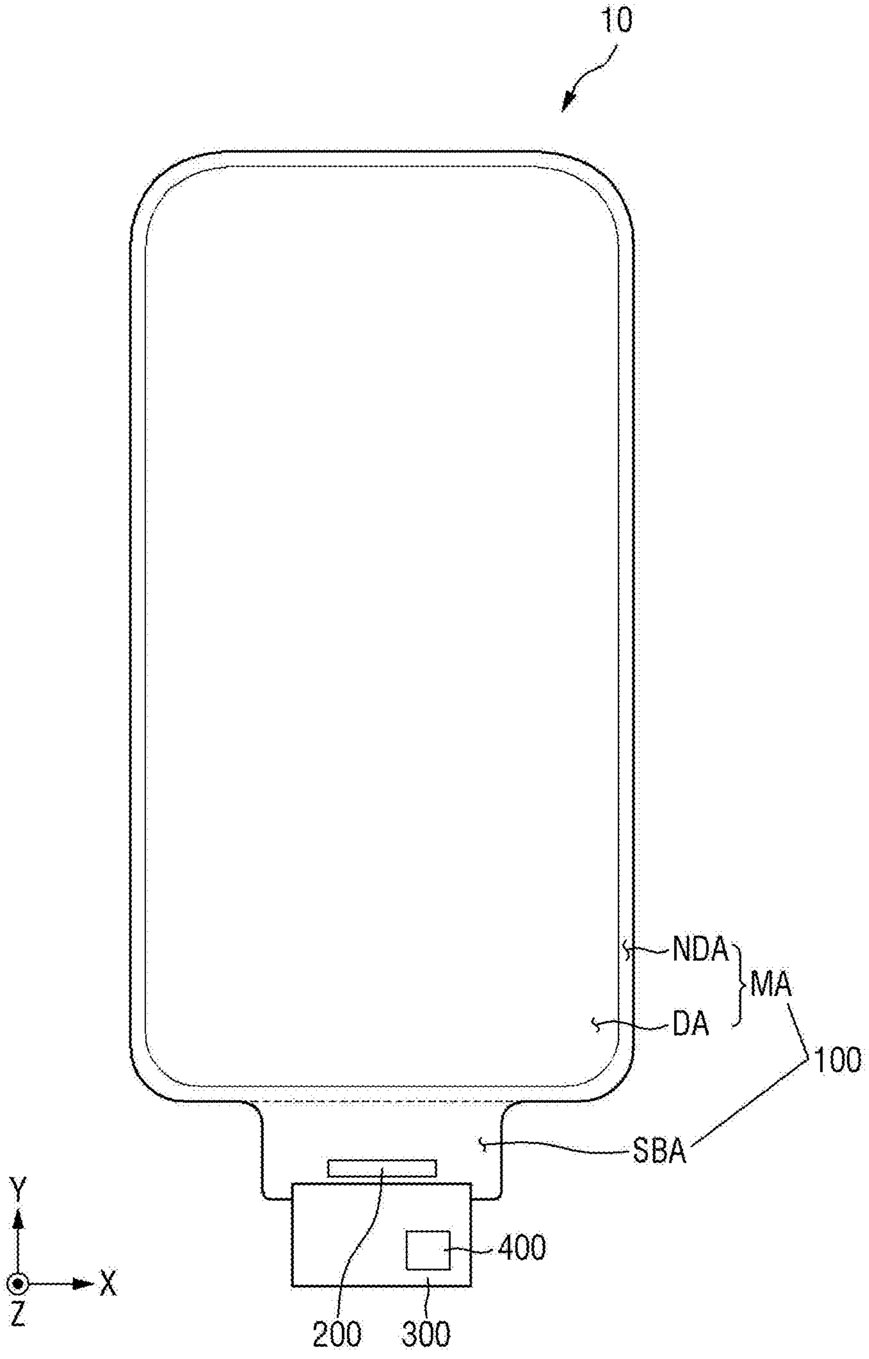
FIG. 2 is a schematic plan view illustrating the display device according to a first embodiment.
Figure 3:
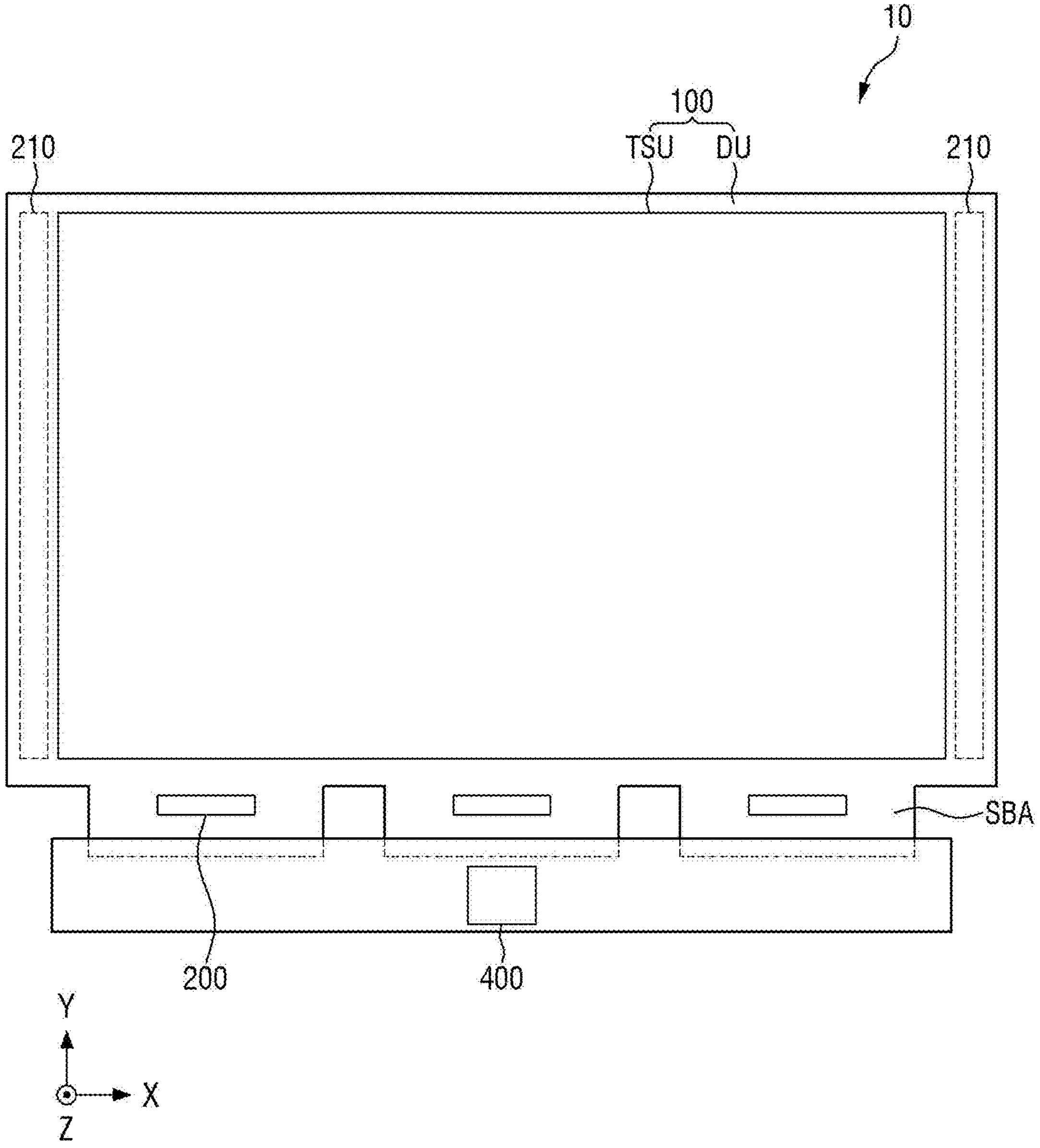
FIG. 3 is a schematic plan view illustrating a display device according to a second embodiment.

FIG. 1 is a schematic perspective view illustrating a display device according to a first embodiment, and FIG. 2 is a schematic plan view illustrating the display device according to a first embodiment. FIG. 3 is a schematic plan view illustrating a display device according to a second embodiment.

Referring to FIGS. 1 and 2, a display device 10 according to an embodiment may be applied to portable electronic devices such as mobile phones, smartphones, tablet personal computers (PCs), mobile communication terminals, laptops, electronic notebooks, electronic books, portable multimedia players (PMPs), navigation devices, and ultra mobile PCs (UMPCs). The display device 10 according to an embodiment may be applied to wearable devices such as smart watches, watch phones, glasses-type displays, and head mounted displays (HMDs).

Referring to FIG. 3, the display device 10 according to an embodiment may be applied to portable electronic devices such as mobile phones, smartphones, tablet PCs, mobile communication terminals, laptops, electronic notebooks, electronic books, PMPs, navigation devices, and UMPCs. The display device 10 according to an embodiment may be applied to a center information display (CID) disposed on an instrument board, a center fascia, or a dashboard of a vehicle, a room mirror display substituting for a side-view mirror of the vehicle, or a display disposed on a rear surface of a front seat as entertainment for a rear seat of the vehicle.

The display device 10 according to an embodiment may be variously classified according to a display method. For example, the display device 10 may be a light emitting display device such as an organic light emitting display device using organic light emitting diodes, a quantum dot light emitting display device including quantum dot light emitting layers, an inorganic light emitting display device including inorganic semiconductors, and a micro light emitting display device using micro or nano light emitting diodes (micro LEDs or nano LEDs). Hereinafter, it is mainly described that the display device 10 according to an embodiment is an organic light emitting display device, but the display device 10 is not limited to the organic light emitting display device, and may be other display devices mentioned above or well-known in the art without departing from the scope or technical idea of the disclosure.

The display device 10 according to an embodiment may include a display panel 100, a display driving circuit 200, a circuit board 300, and a touch driving circuit 400.

The display panel 100 may be formed in a rectangular shape, in plan view, having short sides in a first direction (X-axis direction) and long sides in a second direction (Y-axis direction) intersecting the first direction (X-axis direction). A corner where the short side in the first direction (X-axis direction) and the long side in the second direction (Y-axis direction) meet may be rounded with a curvature (e.g., a predetermined or selectable curvature) or right-angled. A shape of the display panel 100 in plan view is not limited to the rectangular shape, and may be, for example, other polygonal shapes, a circular shape, or an elliptical shape. The display panel 100 may be formed to be flat, but is not limited thereto. For example, the display panel 100 may include curved surface portions formed at left and right ends thereof and having a constant curvature or a variable curvature. The display panel 100 may be flexibly formed to be curved, bent, folded, or rolled.

The display panel 100 may include a main area MA and a sub-area SBA.

The main area MA may include a display area DA displaying an image and a non-display area NDA, which is a peripheral area of the display area DA. The display area DA may include pixels displaying an image. The non-display area NDA may be a peripheral area of the display area DA, for example, an area outside the display area DA. The non-display area NDA may be defined as an edge area of the main area MA corresponding to the display area DA of the display panel 100. As illustrated in FIG. 3, the non-display area NDA may include at least one gate driver 210 supplying gate signals to gate lines and fan-out lines (not illustrated) connecting the display driving circuit 200 and the display area DA to each other.

The sub-area SBA may protrude and extend from a side of the main area MA in the second direction (Y-axis direction). The sub-area SBA may include a flexible material that may be bent, folded, and rolled. The sub-area SBA may include the display driving circuit 200 and pad parts connected to the circuit board 300. As another example, the sub-area SBA may be omitted, and the display driving circuit 200 and the pad parts may be disposed in the non-display area NDA.

Figure 4:
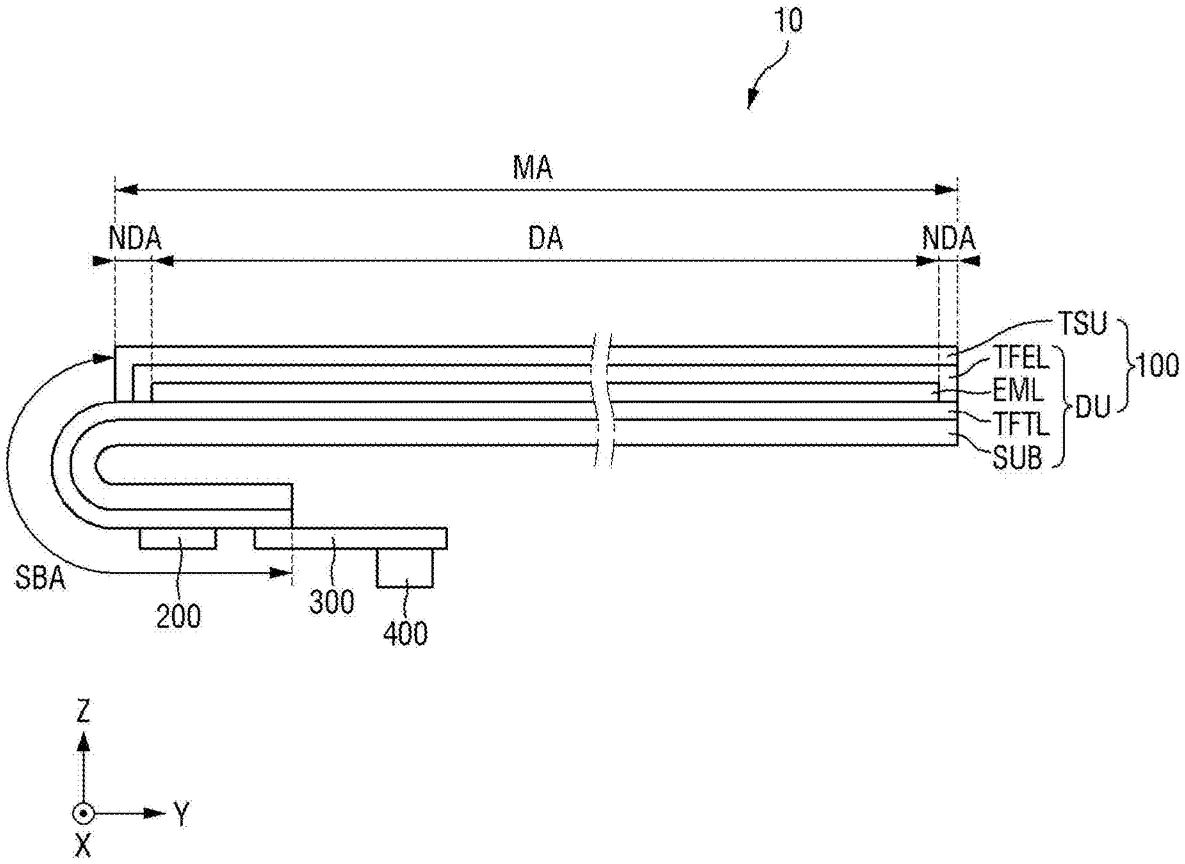
FIG. 4 is a schematic side view illustrating the display device according to first and second embodiments.

FIG. 4 is a schematic side view illustrating the display device according to first and second embodiments.

It has been illustrated in FIGS. 1 to 3 that the sub-area SBA is unbent, but the sub-area SBA may be bent as illustrated in FIG. 4, and in case that the sub-area SBA is bent, the sub-area SBA may be disposed in a rear surface direction of the display panel 100. In other words, in case that the sub-area SBA is bent, the sub-area SBA may overlap a substrate SUB in a thickness direction (Z-axis direction). The display driving circuit 200 may be disposed in the sub-area SBA.

The display panel 100 may include a display module DU including a substrate SUB, a thin film transistor layer TFTL, a light emitting element layer EML, and/or an encapsulation layer TFEL, and a touch sensing unit (or touch sensing part) TSU formed on a front surface of the display module DU.

The substrate SUB may be a base substrate or a base member. For example, the substrate SUB may be a flat-type substrate. As another example, the substrate SUB may be a flexible substrate that may be bent, folded, and/or rolled.

The thin film transistor layer TFTL may be disposed on the substrate SUB. The thin film transistor layer TFTL may include one or more thin film transistors constituting a pixel circuit of each of the pixels. The thin film transistor layer TFTL may further include gate lines, data lines, power lines, gate control lines, fan-out lines connecting the display driving circuit 400 and the data lines to each other, and lead lines connecting the display driving circuit 400 and the pad parts to each other. In case that the gate drivers 210 are formed on a side and another side of the non-display area NDA of the display panel 100, respectively, the respective gate drivers 210 may also include thin film transistors.

The thin film transistor layer TFTL may be selectively disposed in the display area DA, the non-display area NDA, and the sub-area SBA. The thin film transistors of each of the pixels, the gate lines, the data lines, and the power lines of the thin film transistor layer TFTL may be disposed in the display area DA. The gate control lines and the fan-out lines of the thin film transistor layer TFTL may be disposed in the non-display area NDA.

The light emitting element layer EML may be disposed on the thin film transistor layer TFTL. The light emitting element layer EML may include one or more light emitting elements in which a first electrode, a light emitting layer, and a second electrode are sequentially stacked to emit light and a pixel defining film defining the respective pixels. The light emitting element layer EML may be disposed in the display area DA of the main area MA.

The encapsulation layer TFEL may cover (or overlap) an upper surface and side surfaces of the light emitting element layer EML, and may protect the light emitting element layer EML. The encapsulation layer TFEL may be disposed in the display area DA and the non-display area NDA of the main area MA. The encapsulation layer TFEL may include at least one inorganic layer and at least one organic layer for encapsulating the light emitting element layer.

The touch sensing unit TSU may be formed on the encapsulation layer TFEL or mounted on the encapsulation layer TFEL. The touch sensing unit TSU may be disposed on the display area DA of the main area MA. The touch sensing unit TSU may sense a touch of a person or an object using touch electrodes. In the touch sensing unit TSU, the touch electrodes may be arranged in a matrix structure to sense a user's touch using a self-capacitance manner or a mutual capacitance manner.

The touch sensing unit TSU may not be formed integrally with the display panel 100, and may be disposed on a separate substrate or film disposed on the display module DU of the display panel 100. In this case, the substrate or the film supporting the touch sensing unit TSU may be a base member encapsulating the display module DU.

A cover window for protecting an upper portion of the display panel 100 may be disposed on the touch sensing unit TSU. The cover window may be attached onto the touch sensing unit TSU by a transparent adhesive member such as an optically clear adhesive (OCA) film or an optically clear resin (OCR). The cover window may be made of an inorganic material such as glass or be made of an organic material such as plastic or a polymer material. In order to prevent deterioration of visibility of an image due to external light reflection, a polarizing layer may be additionally disposed between the touch sensing unit TSU and the cover window.

The display driving circuit 200 may generate signals and voltages for driving the display panel 100. The display driving circuit 200 may be formed as an integrated circuit (IC) and attached onto the display panel 100 in a chip on glass (COG) manner, a chip on plastic (COP) manner, or an ultrasonic bonding manner, but is not limited thereto. For example, the display driving circuit 200 may be attached onto the circuit board 300 in a chip on film (COF) manner.

The circuit board 300 may be attached to an end of the sub-area SBA of the display panel 100. For this reason, the circuit board 300 may be electrically connected to the display panel 100 and the display driving circuit 200. The display panel 100 and the display driving circuit 200 may receive digital video data, timing signals, and driving voltages through the circuit board 300. The circuit board 300 may be a flexible printed circuit board, a printed circuit board, or a flexible film such as a chip on film.

The touch driving circuit 400 may be disposed on the circuit board 300. The touch driving circuit 400 may be formed as an integrated circuit (IC) and attached to the circuit board 300.

The touch driving circuit 400 may be electrically connected to the touch electrodes of the touch sensing unit TSU. The touch driving circuit 400 may apply touch driving signals to the touch electrodes of the touch sensing unit TSU, and may measure a charge change amount in mutual capacitance of each of one or more touch nodes formed by the touch electrodes. Specifically, the touch driving circuit 400 may measure changes in capacitance of the touch nodes according to changes in voltage magnitude or current amount of touch sensing signals received through the touch electrodes. In this way, the touch driving circuit 400 may decide whether or not a user has touched the display device, whether or not the user has approached the display device, or the like, according to the charge change amount in the mutual capacitance of each of the touch nodes. The touch of the user indicates that a user's finger or an object such as a pen comes into direct contact with one surface of the cover window disposed on the touch sensing unit TSU. The approach of the user may indicate that the user's finger or the object such as the pen hovers above a surface of the cover window with an interval (e.g., a predetermined or selectable interval) from a surface of the cover window.

Figure 5:
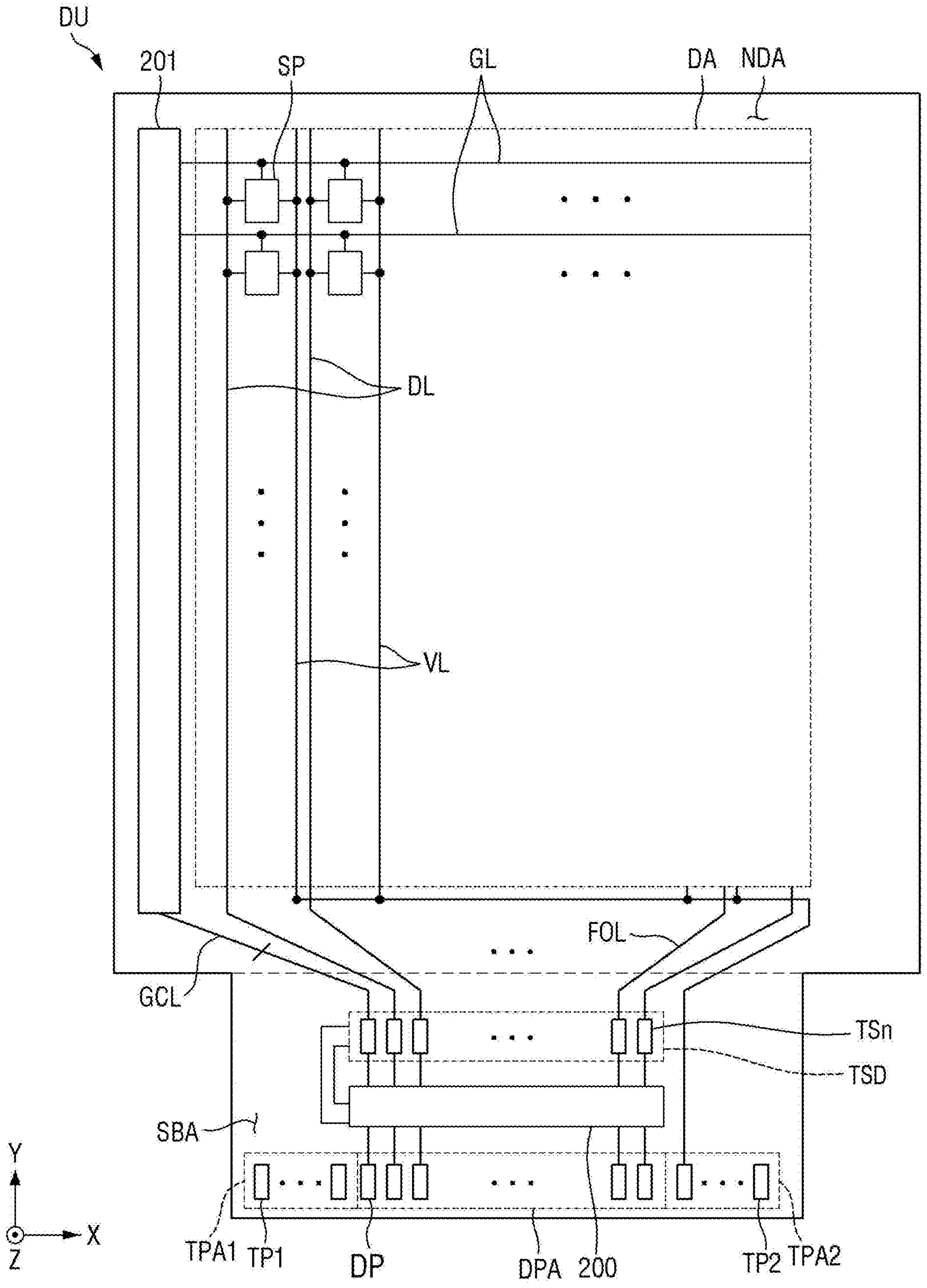
FIG. 5 is a schematic layout diagram illustrating an example of a display panel according to a first embodiment illustrated in FIGS. 1 and 2.
Figure 6:
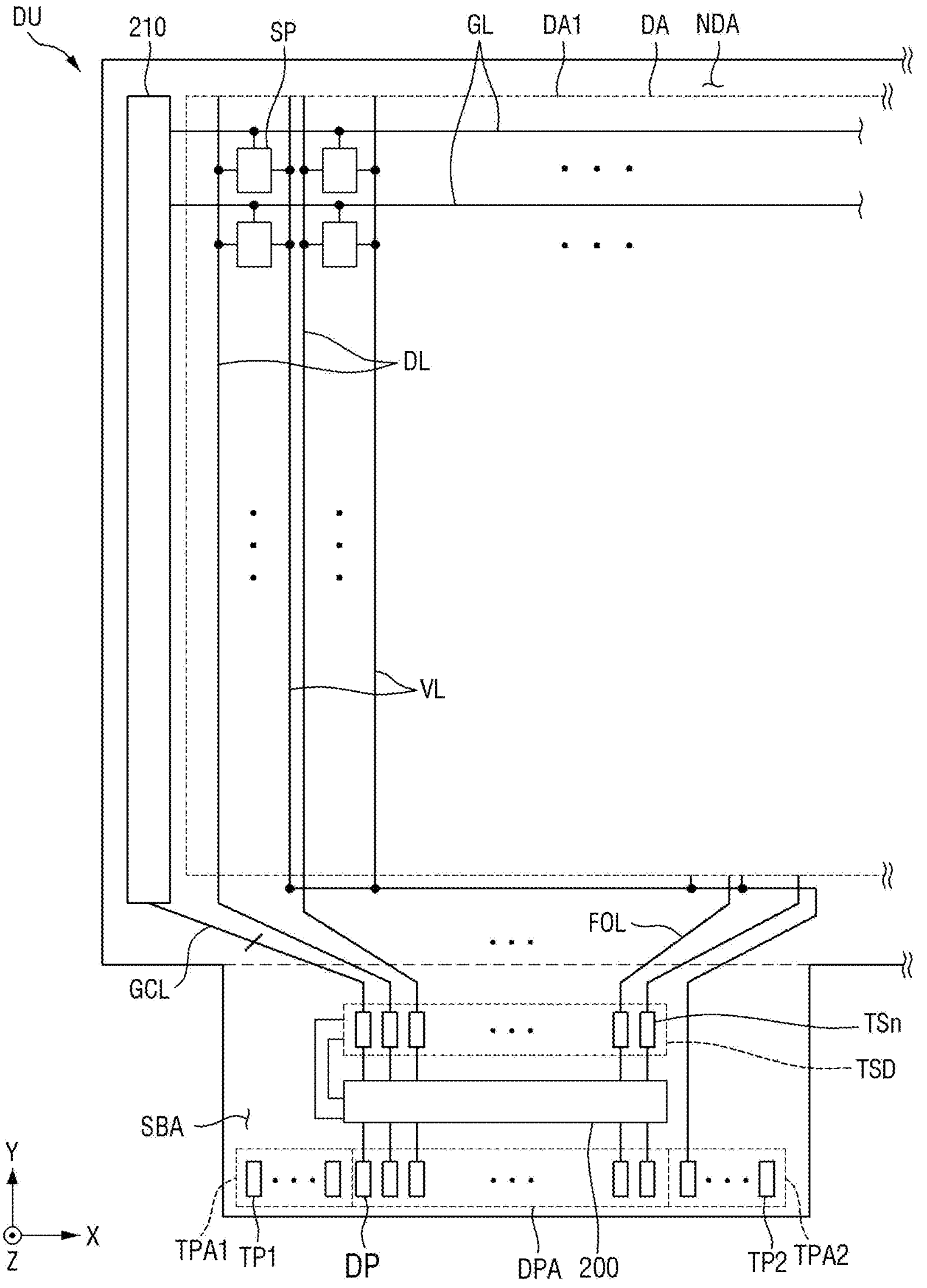
FIG. 6 is a schematic layout diagram illustrating an example of a display panel according to a second embodiment illustrated in FIG. 3.

FIG. 5 is a schematic layout diagram illustrating an example of a display panel according to a first embodiment illustrated in FIGS. 1 and 2. FIG. 6 is a schematic layout diagram illustrating an example of a display panel according to a second embodiment illustrated in FIG. 3. Specifically, FIGS. 5 and 6 are layout diagrams illustrating a display area DA and a non-display area NDA of the display module DU in a state before the touch sensing unit TSU is formed.

The display area DA may be an area displaying an image, and may be defined as a central area of the display panel 100. The display area DA may include one or more pixels SP, one or more gate lines GL, one or more data lines DL, and one or more power lines VL. Each of the pixels SP may be defined as a minimum unit outputting light.

The gate lines GL may supply gate signals, for example, scan signals, received from the gate driver 201 to the pixels SP. The gate lines GL may extend in the X-axis direction and may be spaced apart from each other in the Y-axis direction intersecting the X-axis direction.

The data lines DL may supply data voltages received from the display driving circuit 200 to the pixels SP. The data lines DL may extend in the Y-axis direction and may be spaced apart from each other in the X-axis direction.

The power lines VL may supply source voltages received from the display driving circuit 200 to the pixels SP. Here, the source voltage may be at least one of a driving voltage, an initialization voltage, and a reference voltage. The power lines VL may extend in the Y-axis direction and may be spaced apart from each other in the X-axis direction.

The non-display areas NDA may surround the display area DA or may be adjacent thereto. The non-display area NDA may include the gate driver 201, fan-out lines FOL, and/or gate control lines GCL. The gate driver 201 may generate one or more of gate signals based on gate control signals, and may sequentially supply the plurality of gate signals to the gate lines GL according to a set order.

The fan-out lines FOL may extend from the display driving circuit 200 to the display area DA. The fan-out lines FOL may supply the data voltages received from the display driving circuit 200 to the data lines DL.

The gate control lines GCL may extend from the display driving circuit 200 to the gate driver 201. The gate control lines GCL may supply the gate control signals received from the display driving circuit 200 to the gate driver 201.

The sub-area SBA may include the display driving circuit 200, a display pad area DPA, and first and second touch pad areas TPA1 and TPA2. The display pad area DPA may include one or more display pads DP. The first and second touch pad areas TPA1 and TPA2 may include one or more first touch pads TP1 and one or more second touch pads TP2, respectively.

The display driving circuit 200 may output signals and voltages for driving the display panel 100 to the fan-out lines FOL. The display driving circuit 200 may supply the data voltages to the data lines DL through the fan-out lines FOL. The data voltages may be supplied to the pixels SP, and may determine luminance of the pixels SP. The display driving circuit 200 may supply the gate control signals to the gate driver 201 through the gate control lines GCL.

The display pad area DPA, the first touch pad area TPA1, and the second touch pad area TPA2 may be disposed at an edge of the sub-area SBA. The display pad area DPA, the first touch pad area TPA1, and the second touch pad area TPA2 may be electrically connected to the circuit board 300 using a low-resistance and high-reliability material such as an anisotropic conductive layer or a self-assembly anisotropic conductive paste (SAP).

The display pad area DPA may include one or more display pad parts. The display pad parts may be connected to the display driving circuit 200 or the touch driving circuit 400 through the circuit board 300. The display pad parts may be connected to the circuit board 300 to receive digital video data, and may supply the digital video data to the display driving circuit 200.

A test switching element area TSD formed and used in order to test the display panel 100 before the display panel 100 is commercialized may be included in the non-display area NDA or the sub-area SBA of the display panel 100.

One or more test switching elements TSn electrically connected respectively to the data lines DL formed in the display area DA or the non-display area NDA or the fan-out lines FOL connected to the data lines DL may be disposed in the test switching element area TSD.

Test switching elements electrically connected respectively to the plurality of gate lines GL and the power lines VL formed in the display area DA or the non-display area NDA may be further formed in the test switching element area TSD. Such test switching elements TSn formed in the test switching element area TSD may be connected to at least one of the data lines DL or the fan-out lines FOL, the gate lines GL, and the power lines VL formed in the display area DA or the non-display area NDA in a one-to-one manner.

As described above, in a test step before the display panel 100 is commercialized, a test device may turn on the test switching elements TSn formed in the non-display area NDA or the sub-area SBA of the display panel 100, and may supply scan voltages to the gate lines GL through the test switching elements TSn. As another example, the test device may also supply the gate control signals to the gate driver 210. The test device may also supply high-potential and low-potential driving voltages to the power line VL, respectively. The test device may also turn on the test switching elements TSn connected respectively to the data lines DL or the fan-out lines FOL, and may supply test data voltages to the data lines DL through the test switching elements TSn to allow all pixels SP to emit light.

After a good product is decided through a test, the display driving circuit 200 may be mounted in the non-display area NDA, the sub-area SBA, or the like, of the display panel 100, and the circuit board 300, the touch driving circuit 400, and the like, may be disposed.

The display driving circuit 200 may control turn-off switching operations of the test switching elements TSn so that all of the test switching elements TSn may be maintained in a turn-off state in a commercialized state of the display panel 100 in which the display driving circuit 200, the touch driving circuit 400, and the like, are formed. For example, in a power-off state of the display panel 100 as well as the display device 10, all of the test switching elements TSn may also be in a turn-off state. On the other hand, in case that the display panel 100 as well as the display device 10 is turned on, the display driving circuit 200 may supply the gate control signals to the gate driver 210 and may supply the data voltages to the fan-out lines POL to drive all pixels SP. For example, during an image display period in which the display device 10 is turned on, the display driving circuit 200 may drive all pixels SP to display an image in the display area DA. During such an image display period, the display driving circuit 200 may control the turn-off switching operations of the test switching elements TSn to maintain all of the test switching elements TSn in a stable turn-off state.

All of the test switching elements TSn may be in a state in which they are electrically connected to the data lines DL, the power lines DL, or the gate lines GL, and may thus be electrically affected by changes in voltage and current of the lines to which they are connected, respectively. Accordingly, in case that all of the test switching elements TSn are not maintained in the stable turn-off state, a problem such as leakage of a voltage or a current through the test switching elements TSn may occur. Accordingly, the display driving circuit 200 should control the turn-off switching operations of the test switching elements TSn so that the test switching elements TSn may be more stably maintained in the turn-off even though the test switching elements TSn are electrically affected by specific lines, respectively.

Figure 7:
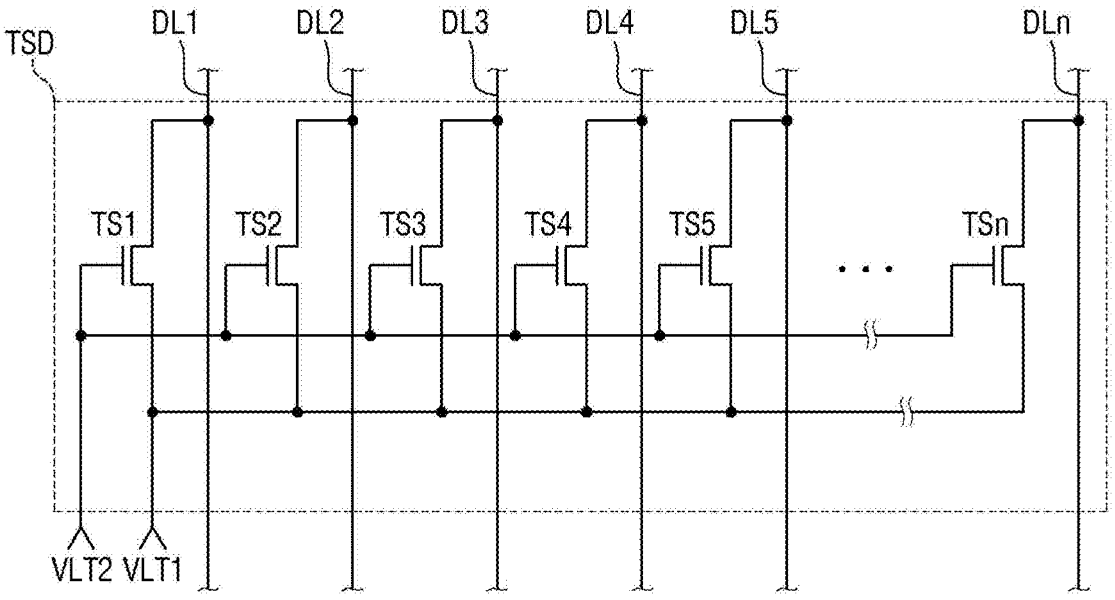
FIG. 7 is a schematic diagram of an equivalent circuit of a first embodiment illustrating test switching elements formed in a test switching element area.

FIG. 7 is a schematic diagram of an equivalent circuit of a first embodiment illustrating test switching elements formed in a test switching element area.

Referring to FIG. 7, first to n-th test switching elements TS1 to TSn connected to first to n-th data lines DL1 to DLn extending to the display area DA or the non-display area NDA in a one-to-one manner may be disposed in the test switching element area TSD. Here, n may be a positive integer excluding 0.

As described above, the test switching elements TSn in the test switching element area TSD may be connected to at least one of the fan-out lines FOL, the gate lines GL, and the power lines VL extending to the display area DA or the non-display area NDA in a one-to-one manner. However, hereinafter, for convenience of detailed explanation, an example in which the test switching elements TSn are connected to the data lines DL in a one-to-one manner will be described.

The first to n-th test switching elements TS1 to TSn may be electrically connected to the first to n-th data lines DL1 to DLn, respectively, in parallel structures with the first to n-th data lines DL1 to DLn. The first to n-th test switching elements TS1 to TSn may be formed as thin film transistors such as metal oxide semiconductor field effect transistors (MOSFETs).

First electrodes of the first to n-th test switching elements TS1 to TSn may be connected to the first to n-th data lines DL1 to DLn in a one-to-one manner, and second electrodes of the first to n-th test switching elements TS1 to TSn may be connected to a first line terminal VLT1 to which a test direct current (DC) voltage (or a test data voltage) or a first off control signal (for example, a first gate-off voltage) is supplied. Gate electrodes of the first to n-th test switching elements TS1 to TSn may be connected to a second line terminal VLT2 to which a gate-on signal or a second off control signal (e.g., a second gate-off voltage) is supplied.

The first to n-th test switching elements TS1 to TSn may be formed as N-type NMOSFETs, and the first electrode of each of the first to n-th test switching elements TS1 to TSn may be a drain electrode and the second electrode of each of the first to n-th test switching elements TS1 to TSn may be a source electrode.

During a test period of the display panel 100, the first to n-th test switching elements TS1 to TSn may be turned on in response to the gate-on signal input to the respective gate electrodes, and may supply the test DC voltage input to the second electrodes to the respective data lines DL1 to DLn to which the first electrodes are connected.

On the other hand, during an image display period in a state in which the display panel 10 is commercialized, the first to n-th test switching elements TS1 to TSn may be maintained in a turn-off state by the second off control signal (e.g., the second gate-off control signal) input to the respective gate electrodes. In this case, the first off control signal (e.g., the first gate-off voltage) may be supplied to the first electrodes. The first to n-th test switching elements TS1 to TSn may be maintained in the stable turn-off state so that data voltages of the data lines DL1 to DLn are not leaked even though magnitudes of the data voltages of the data lines DL1 to DLn respectively connected to the first electrodes are changed.

In case that the first to n-th test switching elements TS1 to TSn are connected to the respective gate lines GL and power lines VL, the first electrodes of the first to n-th test switching elements TS1 to TSn may be connected to the respective gate lines GL and power lines VL in a one-to-one manner. In this case, the second electrodes of the first to n-th test switching elements TS1 to TSn may be connected to the first line terminal VLT1 to which a scan voltage or the first off control signal (e.g., the first gate-off voltage) is supplied. The gate electrodes of the first to n-th test switching elements TS1 to TSn may be connected to the second line terminal VLT2 to which the gate-on signal or the second off control signal (e.g., the second gate-off voltage) is supplied.

Figure 8:
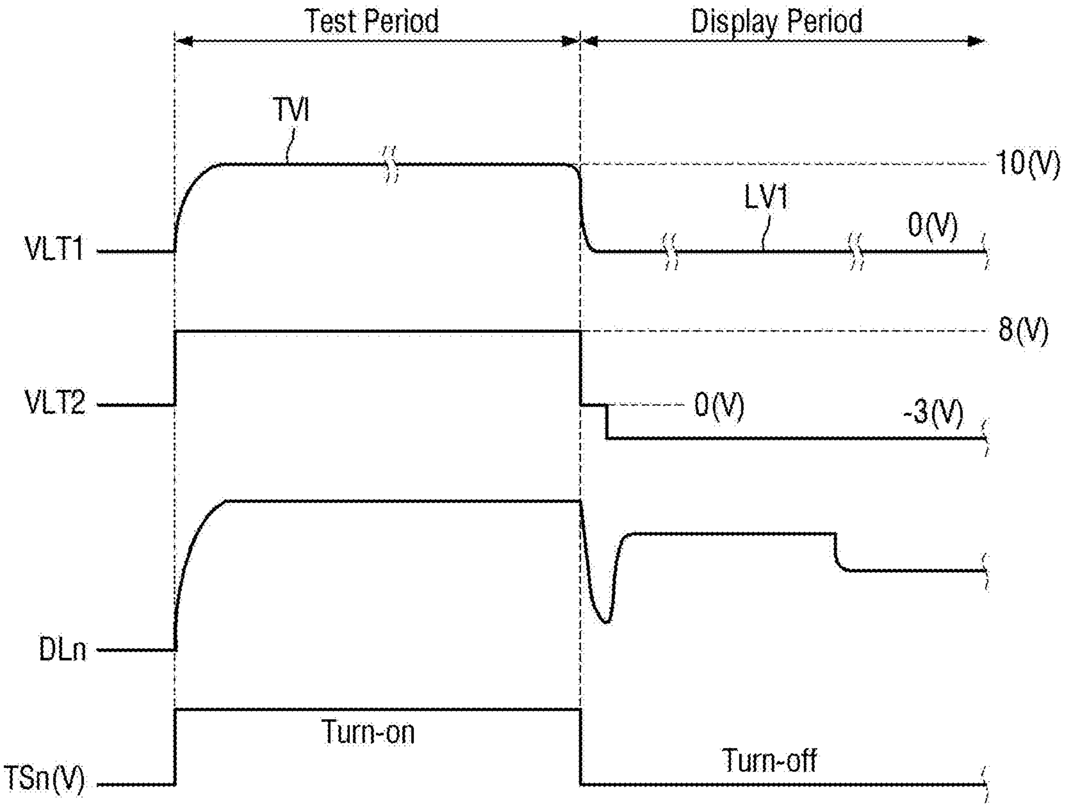
FIG. 8 is a waveform diagram illustrating switching control signals supplied to the test switching elements of FIG. 7 and changes in voltage magnitude of data lines.

FIG. 8 is a waveform diagram illustrating switching control signals supplied to the test switching elements of FIG. 7 and changes in voltage magnitude of data lines.

Referring to FIG. 8, in a test period before the display panel 100 is commercialized, the test device may supply a test DC voltage TVI (e.g., a test data voltage of about 10 V) to the second electrodes of the first to n-th test switching elements TS1 to TSn through the first line terminal VLT1 of the display panel 100. The test device may supply a gate-on signal (e.g., a DC voltage of about 8 V) to the gate electrodes of the first to n-th test switching elements TS1 to TSn through the second line terminal VLT2 of the display panel 100.

The first to n-th test switching elements TS1 to TSn may be turned on by the gate-on signal supplied to the gate electrodes, and may supply the test DC voltage TVI input to the second electrodes to the respective data lines DL1 to DLn to which the first electrodes are connected.

Thereafter, during a period in case that the display panel 100 is commercialized and displays an image, the display driving circuit 200 may maintain the second electrodes of the first to n-th test switching elements TS1 to TS1 in a floating state (e.g., a state of 0 V) through the first line terminal VLT1 of the display panel 100 or supply a first off control signal LV1 (e.g., a first gate-off voltage of about 0 V) to the first line terminal VLT1. The display driving circuit 200 may turn off the first to n-th test switching elements TS1 to TSn by supplying a second off control signal (e.g., a second gate-off voltage of about −3 V) to the gate electrodes of the first to n-th test switching elements TS1 to TSn through the second line terminal VLT2 of the display panel 100.

During an image display period, the display driving circuit 200 may supply data voltages for image display to the respective data lines DL1 to DLn connected to the first to n-th test switching elements TS1 to TSn in parallel in units of at least one frame period.

During the image display period, the display driving circuit 200 may supply the second off control signal (e.g., the second gate-off voltage of about −3 V) having a lower voltage magnitude than the first off control signal (e.g., the first gate-off voltage of about 0 V) to the gate electrodes of the first to n-th test switching elements TS1 to TSn.

The display driving circuit 200 may maintain all of the test switching elements TSn in the stable turn-off state by controlling the turn-off switching operations of the test switching elements TSn using the second off control signal (e.g., the second gate-off voltage of about −3 V) having the lower voltage magnitude than the first off control signal (e.g., the first gate-off voltage of about 0 V) during the image display period.

Figure 9:
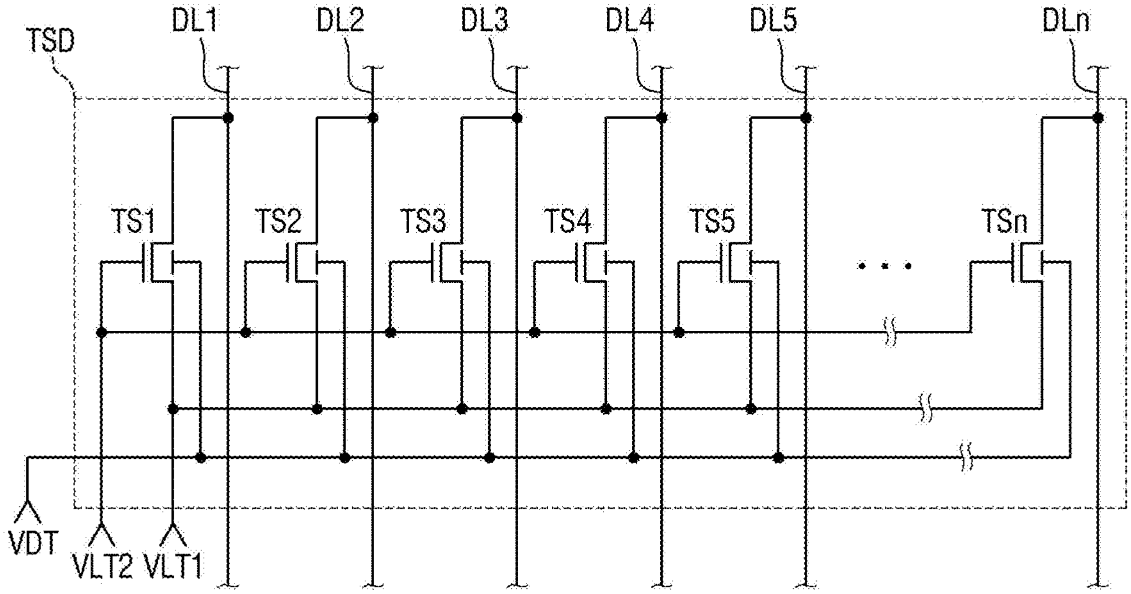
FIG. 9 is a schematic diagram of an equivalent circuit of a second embodiment illustrating test switching elements formed in a test switching element area.

FIG. 9 is a schematic diagram of an equivalent circuit of a second embodiment illustrating test switching elements formed in a test switching element area.

As described above, the test switching elements TSn in the test switching element area TSD may be connected to at least one of the fan-out lines FOL, the gate lines GL, and the power lines VL extending to the display area DA or the non-display area NDA in a one-to-one manner. As illustrated in FIG. 9, first to n-th test switching elements TS1 to TSn connected to first to n-th data lines DL1 to DLn extending to the display area DA or the non-display area NDA in a one-to-one manner may be disposed in the test switching element area TSD.

Referring to FIG. 9, first electrodes of the first to n-th test switching elements TS1 to TSn may be connected to the first to n-th data lines DL1 to DLn in a one-to-one manner, and second electrodes of the first to n-th test switching elements TS1 to TSn may be connected to a first line terminal VLT1 to which a test DC voltage (or a test data voltage) or a first off control signal (for example, a first gate-off voltage) is supplied.

First and second gate electrodes of the first to n-th test switching elements TS1 to TSn may be formed as double layers by overlapping each other with at least one interlayer insulating layer interposed therebetween. Accordingly, the first gate electrodes of the first to n-th test switching elements TS1 to TSn may be connected to a second line terminal VLT2 to which a gate-on signal or a second off control signal (e.g., a second gate-off voltage) is supplied. The second gate electrodes of the first to n-th test switching elements TS1 to TSn may be connected to a DC voltage line terminal VDT to which a third off control signal (e.g., a third gate-off voltage) having a preset DC voltage magnitude is supplied.

In case that the first to n-th test switching elements TS1 to TSn are connected to the respective gate lines GL and power lines VL, the first electrodes of the first to n-th test switching elements TS1 to TSn may be connected to the respective gate lines GL and power lines VL in a one-to-one manner. In this case, the second electrodes of the first to n-th test switching elements TS1 to TSn may be connected to the first line terminal VLT1 to which a test scan voltage or the first off control signal (e.g., the first gate-off voltage) is supplied. The first gate electrodes of the first to n-th test switching elements TS1 to TSn may be connected to the second line terminal VLT2 to which the gate-on signal or the second off control signal (e.g., the second gate-off voltage) is supplied. The second gate electrodes of the first to n-th test switching elements TS1 to TSn may be connected to the DC voltage line terminal VDT to which the third off control signal (e.g., the third gate-off voltage) having the preset DC voltage magnitude is supplied.

Figure 10:
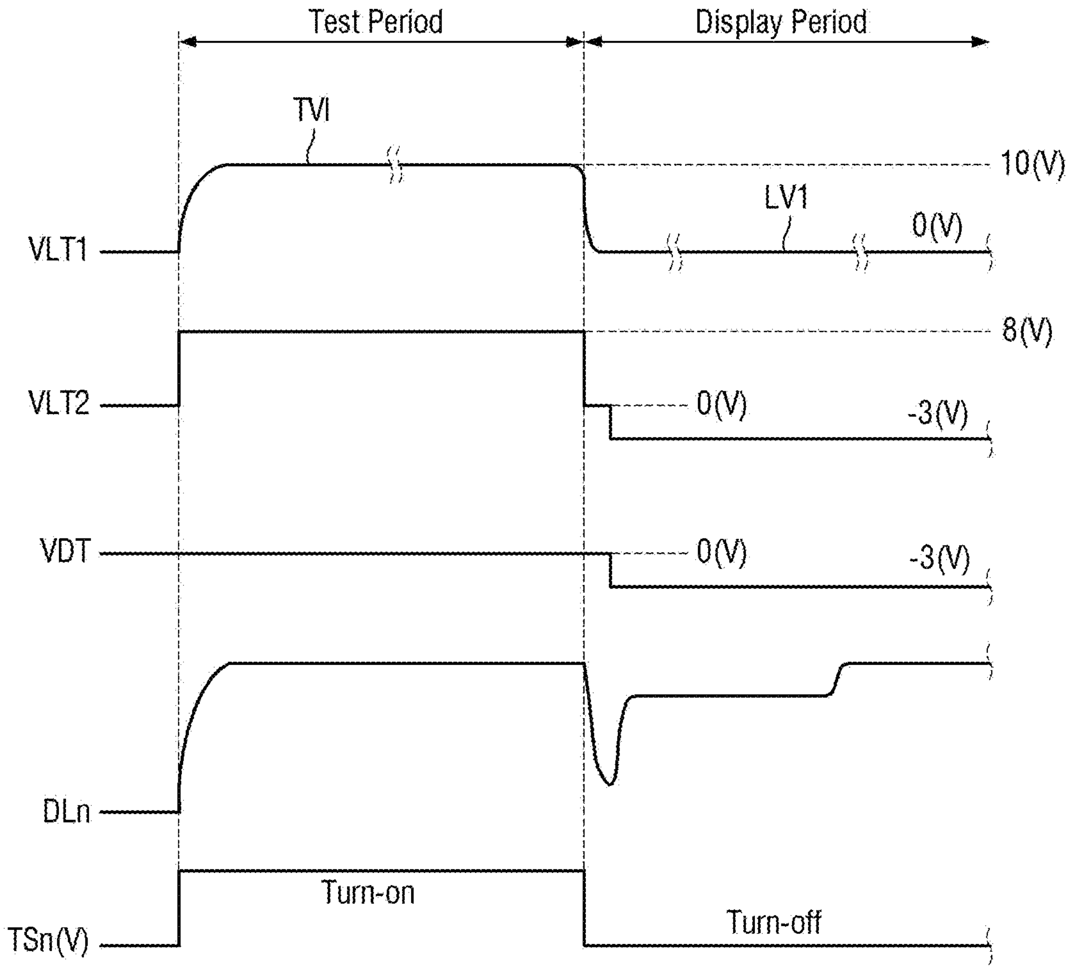
FIG. 10 is a waveform diagram illustrating switching control signals supplied to the test switching elements of FIG. 9 and changes in voltage magnitude of data lines.

FIG. 10 is a waveform diagram illustrating switching control signals supplied to the test switching elements of FIG. 9 and changes in voltage magnitude of data lines.

Referring to FIG. 10, in a test period before the display panel 100 is commercialized, the test device may supply a test DC voltage TVI (e.g., a test data voltage of about 10 V) to the second electrodes of the first to n-th test switching elements TS1 to TSn through the first line terminal VLT1 of the display panel 100. The test device may supply a gate-on signal (e.g., a DC voltage of about 8 V) to the first gate electrodes of the first to n-th test switching elements TS1 to TSn through the second line terminal VLT2 of the display panel 100.

The first to n-th test switching elements TS1 to TSn may be turned on by the gate-on signal supplied to the first gate electrodes, and may supply the test DC voltage TVI input to the second electrodes to the respective data lines DL1 to DLn to which the first electrodes are connected. A DC voltage having a preset magnitude of about 0 V may be supplied to the second gate electrodes of the first to n-th test switching elements TS1 to TSn through the DC voltage line terminal VDT.

During a period in case that the display panel 100 is commercialized and displays an image, the display driving circuit 200 may maintain the second electrodes of the first to n-th test switching elements TS1 to TS1 in a floating state (e.g., a state of 0 V) through the first line terminal VLT1 of the display panel 100 or supply a first off control signal LV1 (e.g., a first gate-off voltage of about 0 V) to the first line terminal VLT1.

The display driving circuit 200 may turn off the first to n-th test switching elements TS1 to TSn by supplying a second off control signal (e.g., a second gate-off voltage of about −3 V) to the first gate electrodes of the first to n-th test switching elements TS1 to TSn through the second line terminal VLT2 of the display panel 100. Particularly, the display driving circuit 200 may supply the second off control signal (e.g., the second gate-off voltage of about −3 V) having a lower voltage magnitude than the first off control signal (e.g., the first gate-off voltage of about 0 V) to the first gate electrodes of the first to n-th test switching elements TS1 to TSn.

The display driving circuit 200 may stably maintain voltage fluctuations of the first and second gate electrodes by supplying a third off control signal (for example, a third gate-off voltage of about 3V) having a preset DC voltage magnitude to the second gate electrodes of the first to n-th test switching elements TS1 to TSn.

Figure 11:
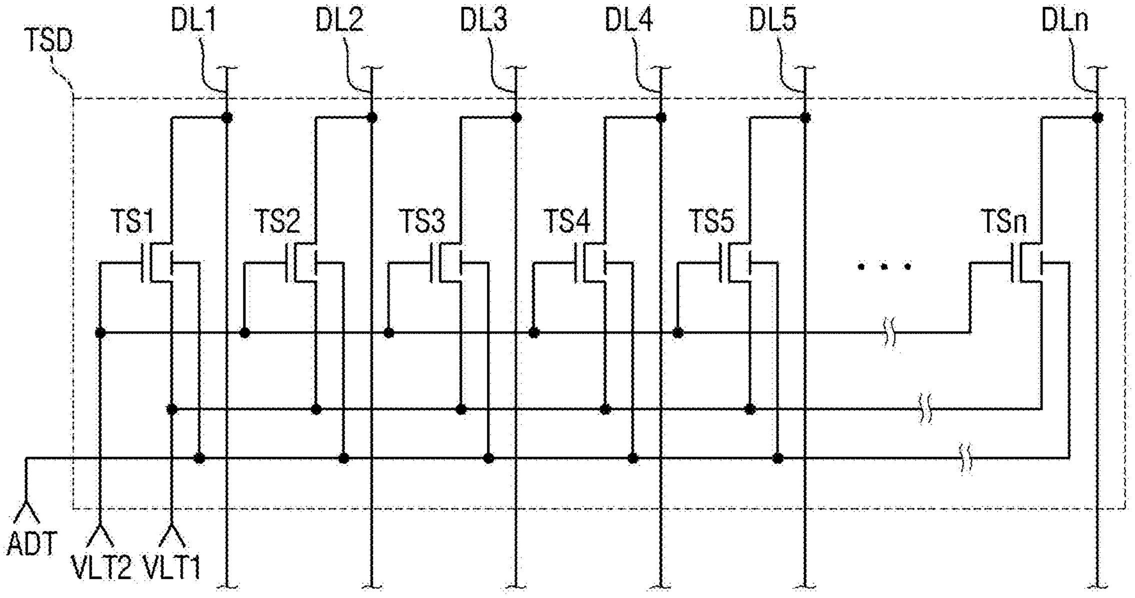
FIG. 11 is a schematic diagram of an equivalent circuit of a third embodiment illustrating test switching elements formed in a test switching element area.

FIG. 11 is a schematic circuit diagram of a third embodiment illustrating test switching elements formed in a test switching element area.

Referring to FIG. 11, first electrodes of first to n-th test switching elements TS1 to TSn may be connected to first to n-th data lines DL1 to DLn in a one-to-one manner, and second electrodes of the first to n-th test switching elements TS1 to TSn may be connected to a first line terminal VLT1 to which a test DC voltage (or a test data voltage) or a first off control signal (for example, a first gate-off voltage) is supplied.

First and second gate electrodes of the first to n-th test switching elements TS1 to TSn may be formed as double layers by overlapping each other with at least one interlayer insulating layer interposed therebetween. Accordingly, the first gate electrodes of the first to n-th test switching elements TS1 to TSn may be connected to a second line terminal VLT2 to which a gate-on signal or a second off control signal (e.g., a second gate-off voltage) is supplied. The second gate electrodes of the first to n-th test switching elements TS1 to TSn may be connected to an alternating current (AC) voltage line terminal ADT to which a third off control signal (e.g., a third gate-off voltage) swinging within a preset voltage range and having an AC voltage magnitude is supplied.

Figure 12:
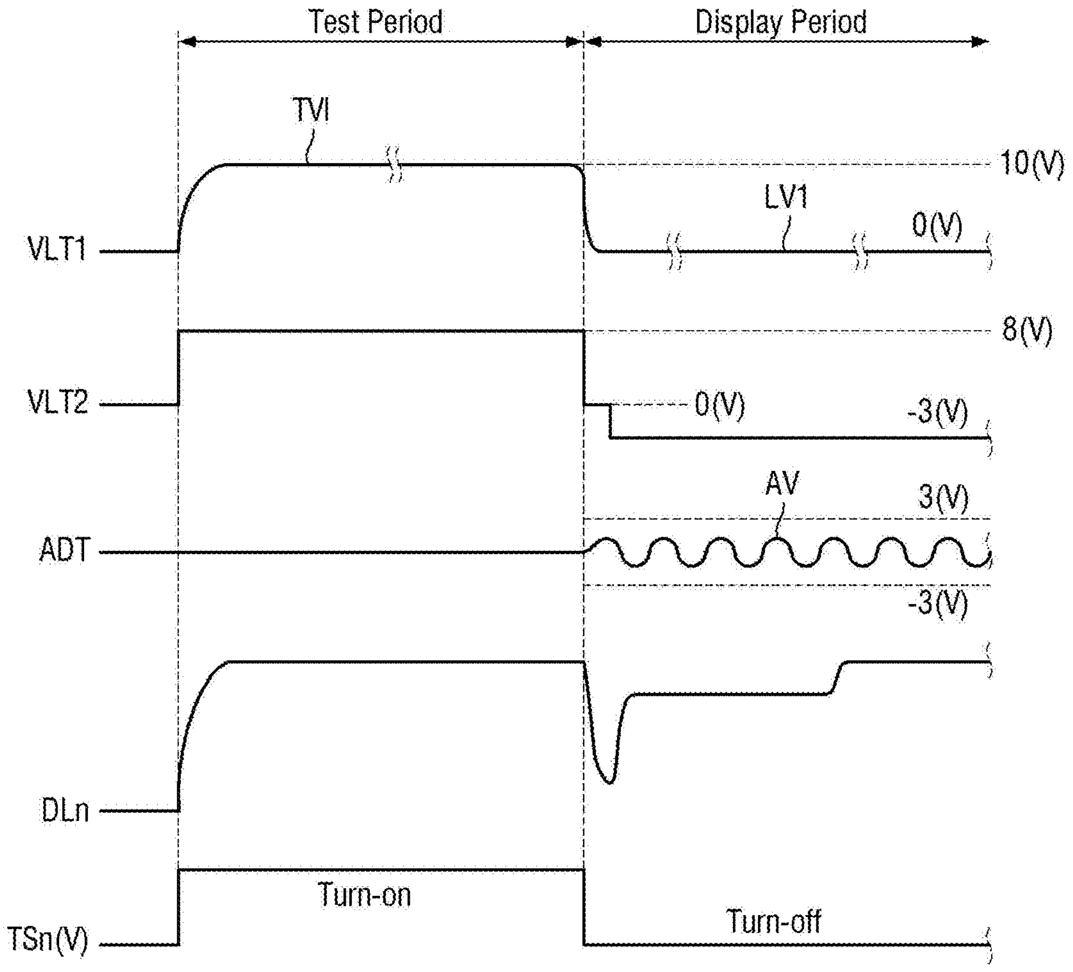
FIG. 12 is a waveform diagram illustrating switching control signals supplied to the test switching elements of FIG. 11 and changes in voltage magnitude of data lines.

FIG. 12 is a waveform diagram illustrating switching control signals supplied to the test switching elements of FIG. 11 and changes in voltage magnitude of data lines.

During a period when the display panel 100 is commercialized and displays an image, the display driving circuit 200 may maintain the second electrodes of the first to n-th test switching elements TS1 to TS1 in a floating state (e.g., a state of about 0 V) through the first line terminal VLT1 of the display panel 100 or supply a first off control signal LV1 (e.g., a first gate-off voltage of about 0 V) to the first line terminal VLT1.

The display driving circuit 200 may turn off the first to n-th test switching elements TS1 to TSn by supplying a second off control signal (e.g., a second gate-off voltage of about −3 V) to the first gate electrodes of the first to n-th test switching elements TS1 to TSn through the second line terminal VLT2 of the display panel 100. Particularly, the display driving circuit 200 may supply the second off control signal (e.g., the second gate-off voltage of about −3 V) having a lower voltage magnitude than the first off control signal (e.g., the first gate-off voltage of about 0 V) to the first gate electrodes of the first to n-th test switching elements TS1 to TSn.

The display driving circuit 200 may stably maintain voltages of the first and second gate electrodes so that the voltages of the first and second gate electrodes fluctuate only within a preset range by supplying a third off control signal AV (e.g., a third gate-off voltage swinging in the range of −3 V to 3 V) swinging within a preset voltage range and having an AC voltage magnitude to the second gate electrodes of the first to n-th test switching elements TS1 to TSn.

Figure 13:
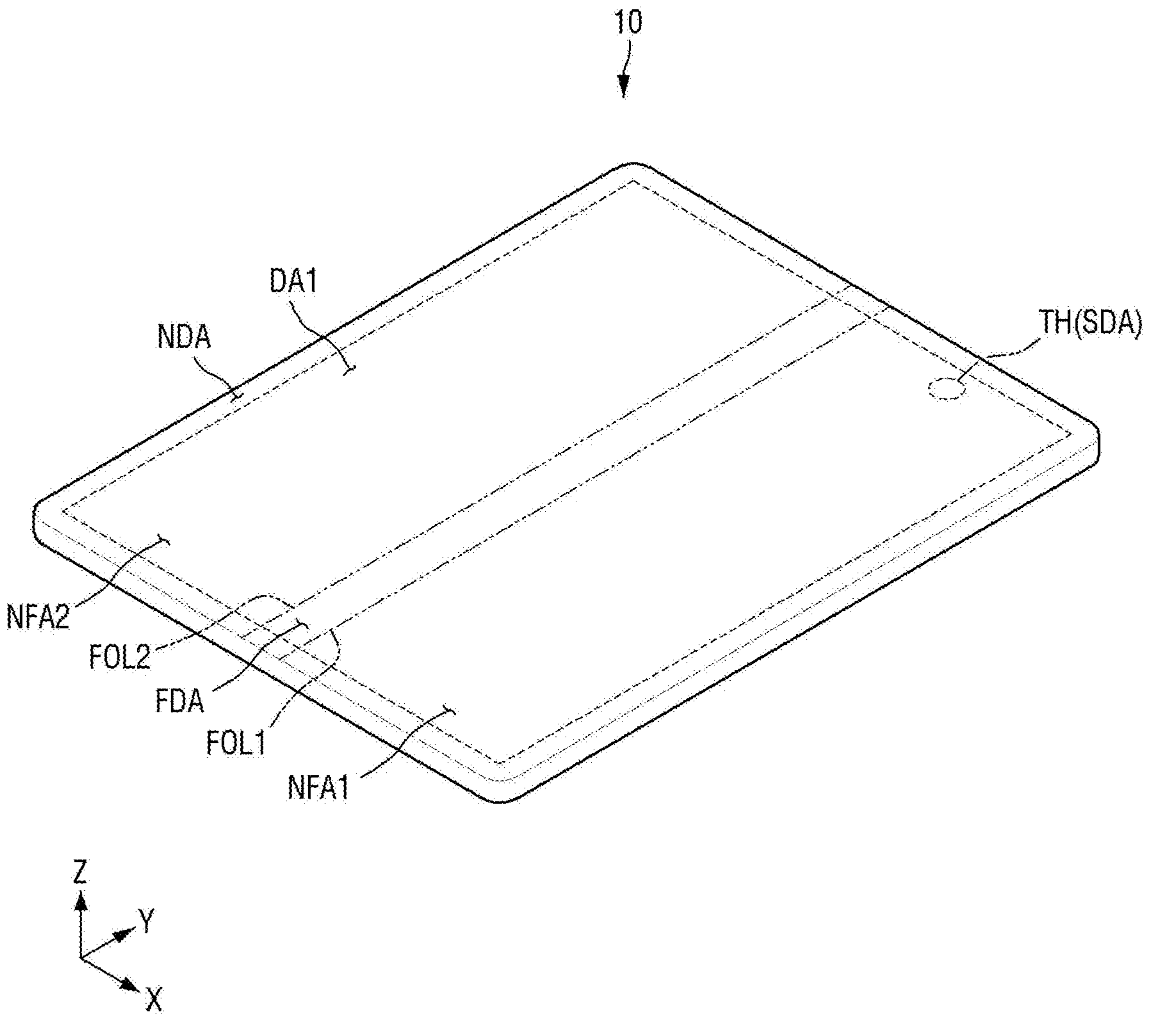
FIGS. 13 and 14 are schematic perspective views illustrating a display device according to another embodiment of the disclosure.
Figure 14:
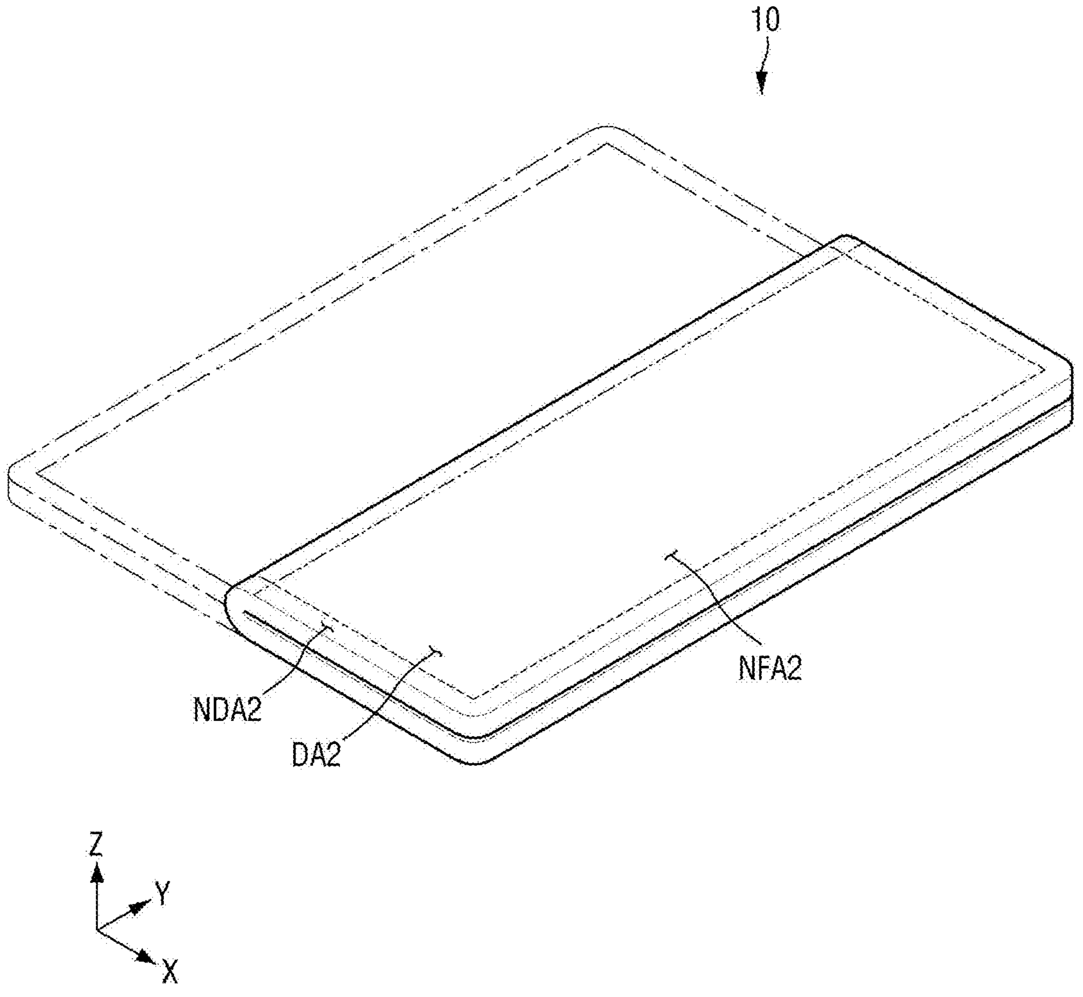

FIGS. 13 and 14 are schematic perspective views illustrating a display device according to another embodiment of the disclosure.

It has been illustrated in FIGS. 13 and 14 that a display device 10 may be a foldable display device folded in the first direction (X-axis direction). The display device 10 may be maintained in both a folded state and an unfolded state. The display device 10 may be folded in an in-folding manner in which a front surface thereof is disposed inside. In case that the display device 10 is bent or folded in the in-folding manner, front surfaces of the display device 10 may be disposed to face each other. As another example, the display device 10 may be folded in an out-folding manner in which a front surface thereof is disposed outside. In case that the display device 10 is bent or folded in the out-folding manner, rear surfaces of the display device 10 may be disposed to face each other.

A first non-folding area NFA1 may be disposed on a side, for example, the right side, of a folding area FDA. A second non-folding area NFA2 may be disposed on another side, for example, the left side, of the folding area FDA. The touch sensing units TSU according to an embodiment of the disclosure may be formed and disposed on the first non-folding area NFA1 and the second non-folding area NFA2, respectively.

A first folding line FOL1 and a second folding line FOL2 may extend in the second direction (Y-axis direction), and the display device 10 may be folded in the first direction (X-axis direction). For this reason, a length of the display device 10 in the first direction (X-axis direction) may be reduced by approximately half, and thus, a user may conveniently carry the display device 10.

An extension direction of the first folding line FOL1 and an extension direction of the second folding line FOL2 are not limited to the second direction (Y-axis direction). For example, the first folding line FOL1 and the second folding line FOL2 may extend in the first direction (X-axis direction), and the display device 10 may be folded in the second direction (Y-axis direction). In this case, a length of the display device 10 in the second direction (Y-axis direction) may be reduced by approximately half. As another example, the first folding line FOL1 and the second folding line FOL2 may extend in a diagonal direction of the display device 10 corresponding to a direction between the first direction (X-axis direction) and the second direction (Y-axis direction). In this case, the display device 10 may be folded in a triangular shape.

In case that the first folding line FOL1 and the second folding line FOL2 extend in the second direction (Y-axis direction), a length of the folding area FDA in the first direction (X-axis direction) may be smaller than a length of the folding area FDA in the second direction (Y-axis direction). A length of the first non-folding area NFA1 in the first direction (X-axis direction) may be greater than the length of the folding area FDA in the first direction (X-axis direction). A length of the second non-folding area NFA2 in the first direction (X-axis direction) may be greater than the length of the folding area FDA in the first direction (X-axis direction).

A first display area DA1 may be disposed on a front surface of the display device 10. The first display area DA1 may overlap the folding area FDA, the first non-folding area NFA1, and the second non-folding area NFA2. Therefore, in case that the display device 10 is unfolded, an image may be displayed in a front surface direction in the folding area FDA, the first non-folding area NFA1, and the second non-folding area NFA2 of the display device 10.

A second display area DA2 may be disposed on a rear surface of the display device 10. The second display area DA2 may overlap the second non-folding area NFA2. Therefore, in case that the display device 10 is folded, an image may be displayed in a front surface direction in the second non-folding area NFA2 of the display device 10.

It has been illustrated in FIGS. 13 and 14 that a through hole TH in which a camera or the like is formed is disposed in the first non-folding area NFA1, but the disclosure is not limited thereto. The through hole TH or the camera may be disposed in the second non-folding area NFA2 or the folding area FDA.

Figure 15:
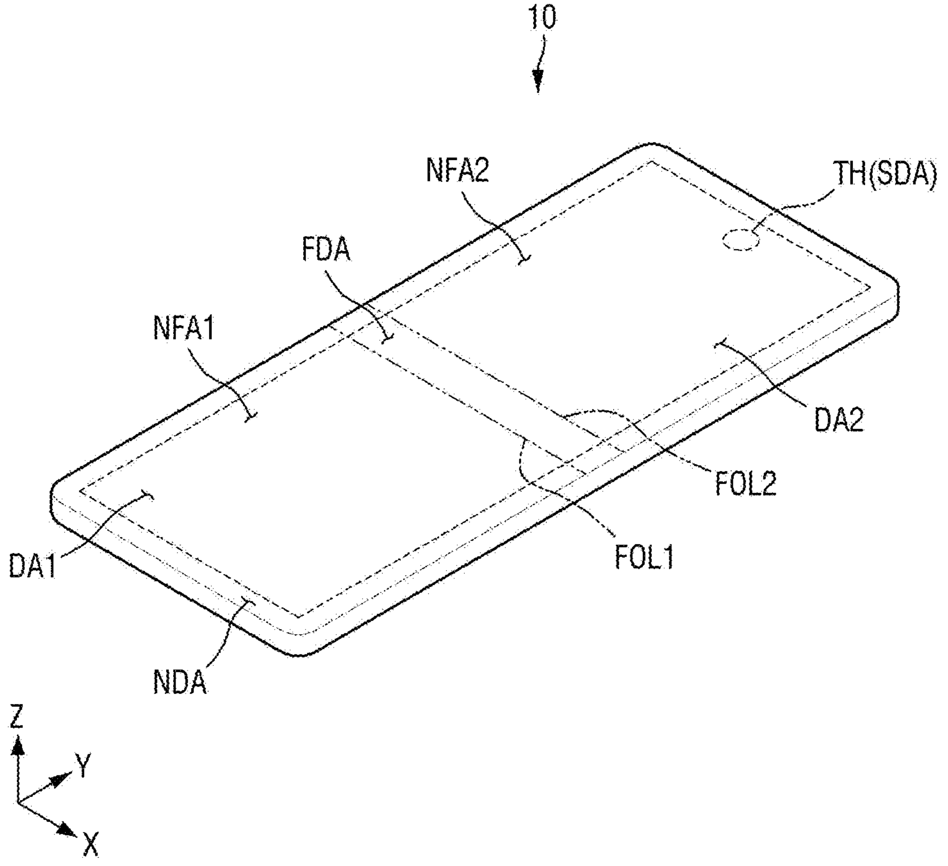
FIGS. 15 and 16 are schematic perspective views illustrating a display device according to still another embodiment of the disclosure.
Figure 16:
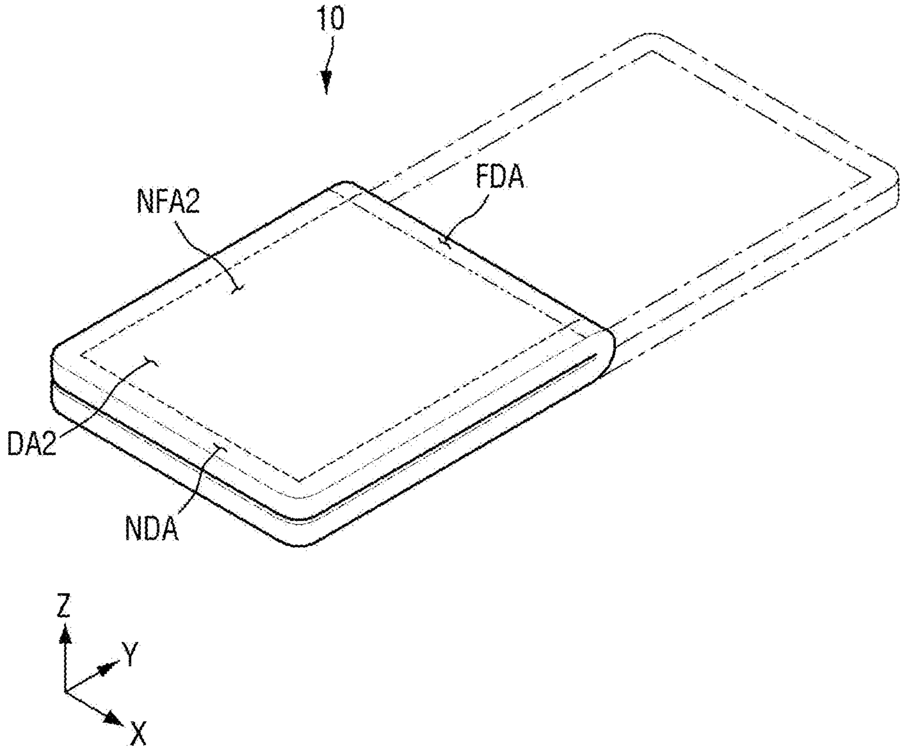

FIGS. 15 and 16 are schematic perspective views illustrating a display device according to still another embodiment of the disclosure.

It has been illustrated in FIGS. 15 and 16 that a display device 10 is a foldable display device folded in the second direction (Y-axis direction). The display device 10 may be maintained in both a folded state and an unfolded state. The display device 10 may be folded in an in-folding manner in which a front surface thereof is disposed inside. In case that the display device 10 is bent or folded in the in-folding manner, front surfaces of the display device 10 may be disposed to face each other. As another example, the display device 10 may be folded in an out-folding manner in which a front surface thereof is disposed outside. In case that the display device 10 is bent or folded in the out-folding manner, rear surfaces of the display device 10 may be disposed to face each other.

The display device 10 may include a folding area FDA, a first non-folding area NFA1, and a second non-folding area NFA2. The folding area FDA may be an area where the display device 10 is folded, and the first non-folding area NFA1 and the second non-folding area NFA2 may be areas where the display device 10 is not folded. The first non-folding area NFA1 may be disposed on a side, for example, the lower side, of the folding area FDA. The second non-folding area NFA2 may be disposed on another side, for example, the upper side, of the folding area FDA.

The touch sensing units TSU according to an embodiment of the disclosure may be formed and disposed on the first non-folding area NFA1 and the second non-folding area NFA2, respectively.

On the other hand, the folding area FDA may be an area bent with a curvature (e.g., a predetermined or selectable curvature) in a first folding line FOL1 and a second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

The first folding line FOL1 and the second folding line FOL2 may extend in the first direction (X-axis direction) as illustrated in FIGS. 15 and 16, and the display device 10 may be folded in the second direction (Y-axis direction). For this reason, a length of the display device 10 in the second direction (Y-axis direction) may be reduced by approximately half, and thus, a user may conveniently carry the display device 10.

An extension direction of the first folding line FOL1 and an extension direction of the second folding line FOL2 are not limited to the first direction (X-axis direction). For example, the first folding line FOL1 and the second folding line FOL2 may extend in the second direction (Y-axis direction), and the display device 10 may be folded in the first direction (X-axis direction). In this case, a length of the display device 10 in the first direction (X-axis direction) may be reduced by approximately half. As another example, the first folding line FOL1 and the second folding line FOL2 may extend in a diagonal direction of the display device 10 corresponding to a direction between the first direction (X-axis direction) and the second direction (Y-axis direction). In this case, the display device 10 may be folded in a triangular shape.

In case that the first folding line FOL1 and the second folding line FOL2 extend in the first direction (X-axis direction) as illustrated in FIGS. 15 and 16, a length of the folding area FDA in the second direction (Y-axis direction) may be smaller than a length of the folding area FDA in the first direction (X-axis direction). A length of the first non-folding area NFA1 in the second direction (Y-axis direction) may be greater than the length of the folding area FDA in the second direction (Y-axis direction). A length of the second non-folding area NFA2 in the second direction (Y-axis direction) may be greater than the length of the folding area FDA in the second direction (Y-axis direction).

A first display area DA1 may be disposed on a front surface of the display device 10. The first display area DA1 may overlap the folding area FDA, the first non-folding area NFA1, and the second non-folding area NFA2. Therefore, in case that the display device 10 is unfolded, an image may be displayed in a front surface direction in the folding area FDA, the first non-folding area NFA1, and the second non-folding area NFA2 of the display device 10.

A second display area DA2 may be disposed on a rear surface of the display device 10. The second display area DA2 may overlap the second non-folding area NFA2. Therefore, in case that the display device 10 is folded, an image may be displayed in a front surface direction in the second non-folding area NFA2 of the display device 10.

It has been illustrated in FIGS. 15 and 16 that a through hole TH in which a camera or the like is disposed is disposed in the second non-folding area NFA2, but the disclosure is not limited thereto. The through hole TH may be disposed in the first non-folding area NFA1 or the folding area FDA.

The above description is an example of technical features of the disclosure, and those skilled in the art to which the disclosure pertains will be able to make various modifications and variations. Thus, the embodiments of the disclosure described above may be implemented separately or in combination with each other.

The embodiments disclosed in the disclosure are intended not to limit the technical spirit of the disclosure but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:

a plurality of pixels arranged in a display area of a display panel;

a test switching element area formed in a non-display area or a sub-area of the display panel and including a plurality of test switching elements; and a display driving circuit controlling supply timings of data voltages and driving control signals supplied to the plurality of pixels, wherein the display driving circuit controls turn-off switching operations of the plurality of test switching elements so that the plurality of test switching elements are maintained in a turn-off state during an image display period.

2. The display device of claim 1, wherein the plurality of test switching elements are electrically connected to a plurality of data lines formed in the display area or a plurality of fan-out lines formed in the non-display area in a one-to-one manner in parallel structures with the plurality of data lines or the plurality of fan-out lines.

3. The display device of claim 2, wherein the plurality of test switching elements are electrically connected to a plurality of gate lines formed in the display area or a plurality of power lines extending to the non-display area in a one-to-one manner in parallel structures with the plurality of gate lines or the plurality of power lines.

4. The display device of claim 2, wherein respective first electrodes formed in the plurality of test switching elements are electrically connected to the plurality of data lines in a one-to-one manner, respective second electrodes formed in the plurality of test switching elements are electrically connected to at least one first line terminal to which a test direct current (DC) voltage or a first off control signal is supplied, and respective gate electrodes formed in the plurality of test switching elements are electrically connected to at least one second line terminal to which a gate-on signal or a second off control signal is supplied.

5. The display device of claim 4, wherein the plurality of test switching elements receive the first off control signal supplied to the respective first electrodes during an image display period, and the plurality of test switching elements are maintained in a turn-off state in response to a second off control signal input to the respective gate electrodes.

6. The display device of claim 4, wherein the display driving circuit maintains the respective second electrodes of the plurality of test switching elements in a floating state through the at least one first line terminal or supplies the first off control signal to the at least one first line terminal, and the display driving circuit turns off the plurality of test switching elements by supplying a second off control signal to the respective gate electrodes of the plurality of test switching elements through the at least one second line terminal.

7. The display device of claim 6, wherein the display driving circuit turns off the plurality of test switching elements by supplying the second off control signal having a lower voltage magnitude than the first off control signal to the respective gate electrodes of the plurality of test switching elements.

8. The display device of claim 2, wherein respective first electrodes formed in the plurality of test switching elements are electrically connected to the plurality of data lines in a one-to-one manner, respective second electrodes formed in the plurality of test switching elements are electrically connected to at least one first line terminal to which a test DC voltage or a first off control signal is supplied, first gate electrodes of respective gate electrodes formed as double layers in the plurality of test switching elements are electrically connected to at least one second line terminal to which a gate-on signal or a second off control signal is supplied, and second gate electrodes of the respective gate electrodes formed as the double layers in the plurality of test switching elements are electrically connected to a DC voltage line terminal to which a third off control signal having a preset DC voltage magnitude is supplied.

9. The display device of claim 8, wherein the display driving circuit maintains the respective second electrodes of the plurality of test switching elements in a floating state through the at least one first line terminal or supplies the first off control signal to the at least one first line terminal, the display driving circuit turns off the plurality of test switching elements by supplying the second off control signal to the first respective gate electrodes of the plurality of test switching elements through the at least one second line terminal, and the display driving circuit supplies the third off control signal having the preset DC voltage magnitude to the respective second gate electrodes through the DC voltage line terminal.

10. The display device of claim 9, wherein the display driving circuit turns off the plurality of test switching elements by supplying the second off control signal having a lower voltage magnitude than the first off control signal to the respective first gate electrodes of the plurality of test switching elements.

11. The display device of claim 2, wherein respective first electrodes formed in the plurality of test switching elements are electrically connected to the plurality of data lines in a one-to-one manner, respective second electrodes formed in the plurality of test switching elements are electrically connected to at least one first line terminal to which a test DC voltage or a first off control signal is supplied, first gate electrodes of respective gate electrodes formed as double layers in the plurality of test switching elements are electrically connected to at least one second line terminal to which a gate-on signal or a second off control signal is supplied, and second gate electrodes of the respective gate electrodes formed as the double layers in the plurality of test switching elements are electrically connected to an alternating current (AC) voltage line terminal to which a third off control signal swinging within a preset voltage range and having an AC voltage magnitude is supplied.

12. The display device of claim 11, wherein the display driving circuit maintains the respective second electrodes formed in the plurality of test switching elements in a floating state through the at least one first line terminal or supplies the first off control signal to the at least one first line terminal, the display driving circuit turns off the plurality of test switching elements by supplying the second off control signal to the first respective gate electrodes formed in the plurality of test switching elements through the at least one second line terminal, and the display driving circuit supplies the third off control signal swinging within the preset voltage range and having the AC voltage magnitude to the respective second gate electrodes through the AC voltage line terminal.

13. A display device comprising:

a plurality of pixels arranged in a display area of a display panel;

a gate driver supplying scan signals to gate lines arranged in a non-display area and the display area of the display panel;

a test switching element area formed in the non-display area or a sub-area of the display panel and including a plurality of test switching elements; and a display driving circuit controlling supply timings of data voltages and driving control signals supplied to the plurality of pixels and gate control signals supplied to the gate driver, wherein the display driving circuit controls turn-off switching operations of the plurality of test switching elements so that the plurality of test switching elements are maintained in a turn-off state during an image display period.

14. The display device of claim 13, wherein the plurality of test switching elements are electrically connected to a plurality of data lines formed in the display area or a plurality of fan-out lines formed in the non-display area in a one-to-one manner in parallel structures with the plurality of data lines or the plurality of fan-out lines.

15. The display device of claim 14, wherein the plurality of test switching elements are electrically connected to a plurality of gate lines formed in the display area or a plurality of power lines extending to the non-display area in a one-to-one manner in parallel structures with the plurality of gate lines or the plurality of power lines.

16. The display device of claim 15, wherein respective first electrodes formed in the plurality of test switching elements are electrically connected to the plurality of gate lines in a one-to-one manner, respective second electrodes formed in the plurality of test switching elements are electrically connected to at least one first line terminal to which a test scan voltage or a first off control signal is supplied, and respective gate electrodes formed in the plurality of test switching elements are electrically connected to at least one second line terminal to which a gate-on signal or a second off control signal is supplied.

17. The display device of claim 16, wherein the display driving circuit maintains the respective second electrodes formed in the plurality of test switching elements in a floating state through the at least one first line terminal or supplies the first off control signal to the at least one first line terminal, and the display driving circuit turns off the plurality of test switching elements by supplying the second off control signal to the respective gate electrodes formed in the plurality of test switching elements through the at least one second line terminal.

18. The display device of claim 14, wherein respective first electrodes formed in the plurality of test switching elements are electrically connected to the plurality of data lines in a one-to-one manner, respective second electrodes formed in the plurality of test switching elements are electrically connected to at least one first line terminal to which a test DC voltage or a first off control signal is supplied, and respective gate electrodes formed in the plurality of test switching elements are electrically connected to at least one second line terminal to which a gate-on signal or a second off control signal is supplied.

19. The display device of claim 14, wherein respective first electrodes formed in the plurality of test switching elements are electrically connected to the plurality of data lines in a one-to-one manner, respective second electrodes formed in the plurality of test switching elements are electrically connected to at least one first line terminal to which a test DC voltage or a first off control signal is supplied, first gate electrodes of respective gate electrodes formed as double layers in the plurality of test switching elements are electrically connected to at least one second line terminal to which a gate-on signal or a second off control signal is supplied, and second gate electrodes of the respective gate electrodes formed as the double layers in the plurality of test switching elements are electrically connected to a DC voltage line terminal to which a third off control signal having a preset DC voltage magnitude is supplied.

20. The display device of claim 14, wherein respective first electrodes formed in the plurality of test switching elements are electrically connected to the plurality of data lines in a one-to-one manner, respective second electrodes formed in the plurality of test switching elements are electrically connected to at least one first line terminal to which a test DC voltage or a first off control signal is supplied, first gate electrodes of respective gate electrodes formed as double layers in the plurality of test switching elements are electrically connected to at least one second line terminal to which a gate-on signal or a second off control signal is supplied, and second gate electrodes of the respective gate electrodes formed as the double layers in the plurality of test switching elements are electrically connected to an AC voltage line terminal to which a third off control signal swinging within a preset voltage range and having an AC voltage magnitude is supplied.

* * * * *